United States Patent
Maes et al.

(10) Patent No.: US 6,801,604 B2
(45) Date of Patent: Oct. 5, 2004

(54) UNIVERSAL IP-BASED AND SCALABLE ARCHITECTURES ACROSS CONVERSATIONAL APPLICATIONS USING WEB SERVICES FOR SPEECH AND AUDIO PROCESSING RESOURCES

(75) Inventors: Stephane H. Maes, Danbury, CT (US); David M. Lubensky, Brookfield, CT (US); Andrzej Sakrajda, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/183,125

(22) Filed: Jun. 25, 2002

(65) Prior Publication Data

US 2003/0088421 A1 May 8, 2003

Related U.S. Application Data

(60) Provisional application No. 60/300,755, filed on Jun. 25, 2001.

(51) Int. Cl.[7] .............................................. H04M 1/64
(52) U.S. Cl. ................................. 379/88.17; 379/88.16; 704/270.1; 709/203; 709/231
(58) Field of Search .......................... 379/88.01–88.04, 379/88.16, 88.17, 88.23–88.25; 704/270–275; 717/114, 116; 709/228–231, 201–203, 249, 250

(56) References Cited

U.S. PATENT DOCUMENTS

| 2002/0184373 | A1 | * | 12/2002 | Maes | ........................ 709/228 |
| 2002/0194388 | A1 | * | 12/2002 | Boloker et al. | .............. 709/310 |
| 2003/0005174 | A1 | * | 1/2003 | Coffman et al. | ............ 709/318 |
| 2003/0088421 | A1 | * | 5/2003 | Maes et al. | .............. 704/270.1 |

* cited by examiner

Primary Examiner—Roland Foster
(74) Attorney, Agent, or Firm—F. Chau & Associates, LLC

(57) ABSTRACT

Systems and methods for conversational computing and, in particular, to systems and methods for building distributed conversational applications using a Web services-based model wherein speech engines (e.g., speech recognition) and audio I/O systems are programmable services that can be asynchronously programmed by an application using a standard, extensible SERCP (speech engine remote control protocol), to thereby provide scalable and flexible IP-based architectures that enable deployment of the same application or application development environment across a wide range of voice processing platforms and networks/gateways (e.g., PSTN (public switched telephone network), Wireless, Internet, and VoIP (voice over IP)). Systems and methods are further provided for dynamically allocating, assigning, configuring and controlling speech resources such as speech engines, speech pre/post processing systems, audio subsystems, and exchanges between speech engines using SERCP in a web service-based framework.

22 Claims, 17 Drawing Sheets

UNIVERSAL IP-BASED AND SCALABLE ARCHITECTURES ACROSS CONVERSATIONAL APPLICATIONS USING WEB SERVICES FOR SPEECH AND AUDIO PROCESSING RESOURCES

CROSS REFERENCE TO RELATED APPLICATION

This application claims priority to U.S. Provisional Application Ser. No. 60/300,755, filed on Jun. 25, 2001, which is incorporated herein by reference.

TECHNICAL FIELD

The present invention relates generally to systems and methods for conversational computing and, in particular, to systems and methods for building distributed conversational applications using a Web services-based model wherein speech engines (e.g., speech recognition) and audio I/O systems are implemented as programmable services that can be asynchronously programmed by an application using a standard, extensible SERCP (speech engine remote control protocol), to thereby provide scalable and flexible IP-based architectures that enable deployment of the same application or application development environment across a wide range of voice processing platforms and networks/gateways (e.g., PSTN (public switched telephone network), Wireless, Internet, and VoIP (voice over IP)). The invention is further directed to systems and methods for dynamically allocating, assigning, configuring and controlling speech resources such as speech engines, speech pre/post processing systems, audio subsystems, and exchanges between speech engines using SERCP in a web service-based framework.

BACKGROUND

Telephony generally refers to any telecommunications system involving the transmission of speech information in either wired or wireless environments. Telephony applications include, for example, IP telephony and Interactive Voice Response (IVR), and other voice processing platforms. IP telephony allows voice, data and video collaboration through existing IP telephony-based networks such as LANs, WANs and the Internet as well as IMS (IP multimedia services) over wireless networks. Previously, separate networks were required to handle traditional voice, data and video traffic, which limited their usefulness. Voice and data connections where typically not available simultaneously. Each required separate transport protocols/mechanisms and infrastructures, which made them costly to install, maintain and reconfigure and unable to interoperate. Currently, various applications and APIs are commercially available that that enable convergence of PSTN telephony and telephony over Internet Protocol networks and 2.5G/3G wireless networks. There is a convergence among fixed, mobile and nomadic wireless networks as well as with the Internet and voice networks, as exemplified by 2.5G, 3G and 4G.

IVR is a technology that allows a telephone-based user to input or receive information remotely to or from a database. Currently, there is widespread use of IVR services for telephony access to information and transactions. An IVR system typically (but not exclusively) uses spoken directed dialog and generally operates as follows. A user will dial into an IVR system and then listen to an audio prompts that provide choices for accessing certain menus and particular information. Each choice is either assigned to one number on the phone keypad or associated with a word to be uttered by the user (in voice enabled IVRs) and the user will make a desired selection by pushing the appropriate button or uttering the proper word.

By way of example, a typical banking ATM transaction allows a customer to perform money transfers between savings, checking and credit card accounts, check account balances using IVR over the telephone, wherein information is presented via audio menus. With the IVR application, a menu can be played to the user over the telephone, whereby the menu messages are followed by the number or button the user should press to select the desired option:

a. "for instant account information, press one;"
b. "for transfer and money payment, press two;"
c. "for fund information, press three;"
d. "for check information, press four;"
e. "for stock quotes, press five;"
f. "for help, press seven;" etc.

To continue, the user may be prompted to provide identification information. Over the telephone, the IVR system may playback an audio prompt requesting the user to enter his/her account number (via DTMF or speech), and the information is received from the user by processing the DTMF signaling or recognizing the speech. The user may then be prompted to input his/her SSN and the reply is processed in a similar way. When the processing is complete, the information is sent to a server, wherein the account information is accessed, formatted to audio replay, and then played back to the user over the telephone.

An IVR system may implement speech recognition in lieu of, or in addition to, DTMF keys. Conventional IVR applications use specialized telephony hardware and IVR applications use different software layers for accessing legacy database servers. These layers must be specifically designed for each application. Typically, IVR application developers offer their own proprietary speech engines and APIs (application program interface). The dialog development requires complex scripting and expert programmers and these proprietary applications are typically not portable from vendor to vendor (i.e., each application is painstakingly crafted and designed for specific business logic). Conventional IVR applications are typically written in specialized script languages that are offered by manufacturers in various incarnations and for different hardware platforms. The development and maintenance of such IVR applications requires qualified staff. Thus, current telephony systems typically do not provide interoperability, i.e., the ability of software and hardware on multiple machines from multiple vendors to communicate meaningfully.

VoiceXML is a markup language that has been designed to facilitate the creation of speech applications such as IVR applications. Compared to conventional IVR programming frameworks that employ proprietary scripts and programming languages over proprietary/closed platforms, the VoiceXML standard provides a declarative programming framework based on XML (eXtensible Markup Language) and ECMAScript (see, e.g., the W3C XML specifications (www.w3.org/XML) and VoiceXML forum (www.voicexml.org)). VoiceXML is designed to run on web-like infrastructures of web servers and web application servers (i.e. the Voice browser). VoiceXML allows information to be accessed by voice through a regular phone or a mobile phone whenever it is difficult or not optimal to interact through a wireless GUI micro-browser.

More importantly, VoiceXML is a key component to building multi-modal systems such as multi-modal and conversational user interfaces or mobile multi-modal browsers. Multi-modal solutions exploit the fact that different interaction modes are more efficient for different user interactions. For example, depending on the interaction, talking may be easier than typing, whereas reading may be faster than listening. Multi-modal interfaces combine the use of multiple interaction modes, such as voice, keypad and display to improve the user interface to e-business. Advantageously, multi-modal browsers can rely on VoiceXML browsers and authoring to describe and render the voice interface.

There are still key inhibitors to the deployment of compelling multi-modal applications. Most arise out of the current infrastructure and device platforms. Indeed, the current networking infrastructure is not configured for providing seamless, multi-modal access to information. Indeed, although a plethora of information can be accessed from servers over a communications network using an access device (e.g., personal information and corporate information available on private networks and public information accessible via a global computer network such as the Internet), the availability of such information may be limited by the modality of the client/access device or the platform-specific software applications with which the user is interacting to obtain such information. For instance, current wireless network infrastructure and handsets do not provide simultaneous voice and data access. Middleware, interfaces and protocols are needed to synchronize and manage the different channels. In light of the ubiquity of IP-based networks such as the Internet, and the availability of a plethora a services and resources on the Internet, the advantages of open and interoperable telephony systems are particularly compelling for voice processing applications such as IP telephony systems and IVR.

Another hurdle is that development of multi-modal/conversational applications using current technologies requires not only knowledge of the goal of the application and how the interaction with the users should be defined, but a wide variety of other interfaces and modules external to the application at hand, such as (i) connection to input and output devices (telephone interfaces, microphones, web browsers, palm pilot display); (ii) connection to variety of engines (speech recognition, natural language understanding, speech synthesis and possibly language generation); (iii) resource and network management; and (iv) synchronization between various modalities for multi-modal or conversational applications.

Accordingly, there is strong desire for development of distributed conversational systems having scalable and flexible architectures, which enable implementation of such systems over a wide range of application environments and voice processing platforms.

SUMMARY OF THE INVENTION

The present invention relates generally to systems and methods for conversational computing and, in particular, to systems and methods for building distributed conversational applications using a Web services-based model wherein speech engines (e.g., speech recognition) and audio I/O systems are implemented as programmable services that can be asynchronously programmed by an application using a standard, extensible SERCP (speech engine remote control protocol), to thereby provide scalable and flexible IP-based architectures that enable deployment of the same application or application development environment across a wide range of voice processing platforms and networks/gateways (e.g., PSTN (public switched telephone network), Wireless, Internet, and VoIP (voice over IP)).

The invention is further directed to systems and methods for dynamically allocating, assigning, configuring and controlling speech resources such as speech engines, speech pre/post processing systems, audio subsystems, and exchanges between speech engines using SERCP in a web service-based framework.

In one preferred embodiment, a SERCP framework, which is used for speech engine remote control and network and system load management, is implemented using an XML-based web service framework wherein speech engines and resources comprise programmable services, wherein (i) XML is used to represent data (and XML Schemas to describe data types); (ii) an extensible messaging format is based on SOAP; (iii) an extensible service description language is based on WSDL, or an extension thereof, as a mechanism to describe the commands/interface supported by a given service; (iv) UDDI (Universal Description, Discovery, and Integration) is used to advertise and locate the service; and wherein (v) WSFL (Web Service Flow Language) is used to provide a generic mechanism from combining speech processing services through flow composition.

A conversational system according to an embodiment of the present invention assumes an application environment in which a conversational application comprises a collection of audio processing engines (e.g., audio I/O system, speech processing engines, etc.) that are dynamically associated with an application, wherein the exchange of audio between the audio processing engines is decoupled from control and application level exchanges and wherein the application generates control messages that configure and control the audio processing engines in a manner that renders the exchange of control messages independent of the application model and location of the engines. The speech processing engines can be dynamically allocated to the application on either a call, session, utterance or persistent basis.

Preferably, the audio processing engines comprise web services that are described and accessed using WSDL (Web Services Description Language), or an extension thereof.

In yet another aspect, a conversational system comprises a task manager, which is used to abstract from the application, the discovery of the audio processing engines and remote control of the engines.

The systems and methods described herein may be used in various frameworks. One framework comprises a terminal-based application (located on the client or local to the audio subsystem) that remotely controls speech engine resources. One example of a terminal based application includes a wireless handset-based application that uses remote speech engines, e.g., a multimodal application in "fat client configuration" with a voice browser embedded on the client that uses remote speech engines. Another example of a terminal-based application comprises a voice application that operates on a client having local embedded engines that are used for some speech processing tasks, and wherein the voice application uses remote speech engines when (i) the task is too complex for the local engine, (ii) the task requires a specialized engine, (iii) it would not be possible to download speech data files (grammars, etc . . . ) without introducing significant delays, or (iv) when for IP, security or privacy reasons, it would not be appropriate to download such data files on the client or to perform the processing on the client or to send results from the client.

Another usage framework for the invention is to enable an application located in a network to remotely control different speech engines located in the network. For example, the invention may be used to (i) distribute the processing and perform load balancing, (ii) allow the use of engines optimized for specific tasks, and/or to (iii) enable access and control of third party services specialized in providing speech engine capabilities.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
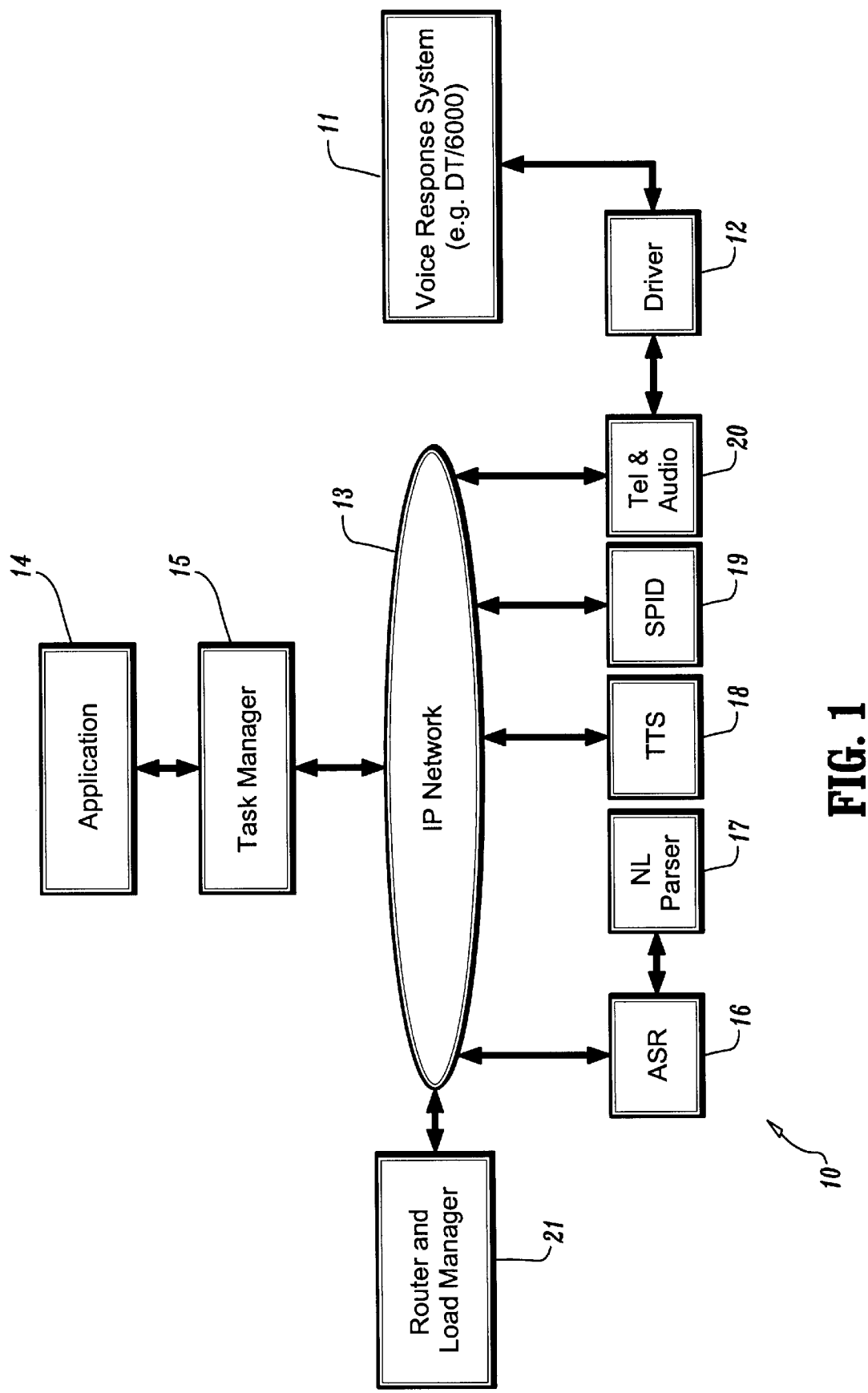
FIG. 1 is a block diagram of a speech processing system according to an embodiment of the present invention.

The present invention is directed to systems and method for implementing universal IP-based and scalable conversational applications and platforms that are interoperable across a plurality of conversational applications, programming or execution models and systems. The term "conversational" and "conversational computing" as used herein refers to seamless, multi-modal (or voice only) dialog (information exchanges) between user and machine and between devices or platforms of varying modalities (I/O capabilities), regardless of the I/O capabilities of the access device/channel, preferably, using open, interoperable communication protocols and standards, as well as a conversational programming model (e.g., conversational gesture-based markup language) that separates the application data content (tier 3) and business logic (tier 2) from the user interaction and data model that the user manipulates. Conversational computing enables humans and machines to carry on a dialog as natural as human-to-human dialog.

Further, the term "conversational application" refers to an application that supports multi-modal, free flow interactions (e.g., mixed initiative dialogs) within the application and across independently developed applications, preferably using short term and long term context (including previous input and output) to disambiguate and understand the user's intention. Preferably, conversational applications utilize NLU (natural language understanding). Multi-modal interactive dialog comprises modalities such as speech (e.g., authored in VoiceXML), visual (GUI) (e.g., HTML (hypertext markup language)), constrained GUI (e.g., WML (wireless markup language), CHTML (compact HTML), HDML (handheld device markup language)), and a combination of such modalities (e.g., speech and GUI). Further, the invention supports voice only (mono-modal) machine driven dialogs and any level of dialog capability in between voice only and free flow multimodal capabilities. As explained below, the invention provides a universal architecture that can handle all these types of capabilities and deployments.

Conversational applications and platforms according to the present invention preferably comprise a scalable and flexible framework that enables deployment of various types of applications and application development environment to provide voice access using various voice processing platforms such as telephony cards and IVR systems over networks/mechanisms such as PSTN, wireless, Internet, and VoIP networks/gateways, etc. A conversational system according to the invention is preferably implemented in a distributed, multi-tier client/server environment, which decouples the conversational applications from distributed speech engines and the telephony/audio I/O components. A conversational platform according to the invention is preferably interoperable with the existing WEB infrastructure to enable delivery of voice applications over telephony, for example, taking advantage of the ubiquity of applications and resources available over the Internet. For example, preferred telephony applications and systems according to the invention enable business enterprises and service providers to give callers access to their business applications and data, anytime, anyplace using any telephone or voice access device.

Referring now to FIG. 1, a block diagram illustrates a conversational system 10 according to an embodiment of the invention. The system 10 comprises a client voice response system 11 that executes on a host machine, which is based, for example, on a AIX, UNIX, or DOS/Windows operating system platform. The client application 11 provides the connectivity to the telephone line (analog or digital), other voice networks (such as IMS, VoIP, etc., wherein the application 11 may be considered as a gateway to the network (or a media processing entity), and other voice processing services (as explained below). Incoming calls/connections are answered by an appropriate client application running on the host machine. More specifically, the host machine can be connected to a PSTN, VoIP network, wireless network, etc., and accessible by a user over an analog telephone line or an IDSN (Integrated Services Digital Network) line, for example. In addition, the host client machine 11 can be connected to a PBX (private branch exchange) system, central office or automatic call distribution center, a VoIP gateway, a wireless support node gateway, etc. The host comprises the appropriate software and APIs that allows the client application 11 to interface to various telephone systems and video phones systems, such as PSTN, digital ISDN and PBX access, VoIP gateway the voice services on the servers. The system 10 is preferably operable in various connectivity environments including, for example, T1, E1, ISDN, CAS, SS7, VoIP, wireless, etc.

The voice response system 11 (or gateway) comprises client enabling code that operates with one or more application servers and conversational engine servers over an IP (Internet Protocol)-based network 13. The IP network 13 may comprise, a LAN, WAN, or a global communication network such as the Internet or wireless network (IMS). In one exemplary embodiment, the host 11 machine comprises an IBM RS/6000 computer that comprises Direct Talk (DT/6000)®, a commercially available platform for voice processing applications. Direct Talk® is a versatile voice processing platform that provides expanded functionality to IVR applications. DirectTalk enables the development and operation of automated customer service solutions for various enterprises and service providers. Clients, customers, employees and other users can interact directly with business applications using telephones connected via public or private networks. DirectTalk supports scalable solutions from various telephony channels operating in customer premises or within telecommunication networks. It is to be understood, however, that the voice response system 11 may comprise any application that is accessible via telephone to provide telephone access to one or more applications and databases, provide interactive dialog with voice response, and data input via DTMF (dual tone multi-frequency). It is to be appreciated that other gateways and media processing entities can be considered.

The system 10 further comprises one or more application servers (or web servers) and speech servers that are distributed over the network 13. The system 10 comprises one or more conversational applications 14 and associated task managers 15. The conversational applications 14 comprise applications such as sales order processing, debt collection, customer service, telephone banking, telephone airline reservations, insurance. The conversational application 14 may comprise a unified messaging application (combined voice and e-mail). The application 14 may reside on an application server (or WEB server). The application 14 can be programmed using industry standards such as Java and VoiceXML (a standards-based programming model for writing interactive voice applications). In other embodiments, the application development environment may comprise conventional IVR programming (state tables or beans, as supported by DirectTalk), imperative programming (e.g., C/C++, Java), scripting (Tel, Perl, . . . ), declarative programming (XML, VoiceXML), scripts and a combination of imperative and declarative programming. The applications 14 are preferably programmed as multi-channel, multi-modal, multi-device and/or conversational free flow applications. Various programming paradigms (non exhaustive) that may be used in the system 10 are described in further detail below with reference to FIGS. 3a–3d, for example.

The task manager 15 can be either common across a plurality of applications or associated with one application (as in the illustrative embodiment of FIG. 1). The task manager 15 is responsible for task execution and acquiring and partitioning resources (e.g., speech engines, data files). Control messages (e.g., XML messages, SOAP message, WSDL/SOAP messages, i.e., based on a web service framework as discussed in detail below) are exchanged between the application 14 and task manager 15 to control, for example, the audio source (e.g., barge-in), "Audio In" events (e.g., ASR), "Audio Out" events (e.g., TTS), configuration (static/dynamic) and registration with a router and load manager 21 (including configuration and exchanges (events and results) between the engines and audio subsystem). Preferably, the application and task manager comprise an XML parser. In one embodiment, the control messages can be passed via Sockets communication. In one preferred embodiment, control messages between the application 14 and task manager 15 are based on a web services framework that implements SOAP/WSDL (as discussed below) or through other APIs or communication protocols. Preferred control messages will be discussed in further detail below.

The system further comprises a plurality of speech servers (or speech engines), which may reside on the same host or different hosts in the network 13. The speech servers comprise, for example, an ASR (automatic speech recognition) server 16, a NL (natural language) parser server 17, a TTS (text-to-speech) server 18, and a SPID (speaker identification/verification) server 19, and any other processors that are used for pre/post processing the audio (e.g., uplink/downlink codecs for encoding/decoding audio data transmitted between the audio subsystem and engines), and the results of other engines.

The ASR server 16 comprises a speech recognition engine for enabling the system to understand spoken utterances of a user for the purpose of processing commands and data input received from the user. The NL parser 17, which is employed for natural language understanding applications, receives data streams from the ASR server 16 and processes the data.

The TTS server 18 comprises a TTS engine to convert text to speech in the telephony environment. The TTS server 18 enables the application 14 to play synthesized prompts at runtime from a text string selected by the application 14, which is useful in circumstances for which a prerecorded prompt is not available. The TTS 18 reduces the need for large number or prerecorded prompts, which can be effectively replaced by dynamically changing text strings. The TTS 18 preferably supports barge-in so that synthesized speech can be interrupted by a caller in the same manner as a prerecorded prompt.

The SPID server 19 (speaker identification and/or verification engine) is used for speaker recognition when the system supports biometric identification/verification.

It is to be understood that the system 10 may comprises other speech servers such as NLG (natural language generation) engines and pre/post processing engines/codecs, etc.

The system 10 further comprises an audio I/O system 20 (or "TEL") which, in the exemplary embodiment of FIG. 1, comprises a telephony card on a gateway). The audio I/O system 20 comprises an audio I/O system and voice access port and platform. Essentially, in the embodiment of FIG. 1, the TEL 20 is a driver. An advantage of the invention, in particular the architecture of FIG. 1 with the audio subsystem (TEL) 20 as a web service, is that the invention enables abstraction of the gateway 11. This allows easy integration of complex engine configurations and platforms/execution environments within gateways that are proprietary and require significant efforts to integrate with or often even impossible to do without close collaboration with the gateway manufacturer. In the present invention, the interface behaves like a driver or web service and any platform/runtime environment can interface to the driver or web service.

In other embodiments, such as when the system 10 comprises direct IVR programming, the audio I/O platform 20 is part of a custom server for the application (as explained below with reference to FIGS. 9 and 10).

The TEL 20 comprises a gateway (e.g., telephony platform) that connects voice audio streams from a network to the various speech engines (possibly with protocol and media conversion e.g. from PSTN to VoIP), such as speech recognition and TTS. The gateway platform comprises an audio subsystem card (e.g. telephony cards) and appropriate devices and software for playing prerecorded/synthesized audio prompts to callers, recording a caller's voice, capturing number information (DTMF), etc. The TEL 20 includes various codecs (DSR optimized codecs or conventional codecs (e.g. AMR)) and DSP support (e.g., for additional preprocessing like Barge-in, speech activity detection, speech processing (noise subtraction, cepstral mean subtraction, etc.) for uplink and downlink coding/decoding. Preferably, TEL 20 provides support for multiple connections/channels (e.g., telephone calls or VoIP/IMS sessions). The TEL 20 preferably supports "Barge-in" and supports full-duplex audio to record and play audio at the same time.

A driver module 12 comprises one or more software drivers for allowing the host system to operate the TEL 20. Telephony/gateway and IVR/conversational exchanges occur between the voice response system 11, drivers 12 and audio I/O system 20.

In general, the router/load manager 21 provides functions such as assigning available speech engines to the applications and assigning applications to ports. More specifically, the router/load manager 21 associates ports of TEL 20 to the application 14. Further, in response to requests from the application 14 (via the task manager 15), the router/load manager 21 associates speech engines to the application 14 on an utterance, session or persistent basis. Each application and speech server registers its state with the router/load manager 21.

Figure 2:
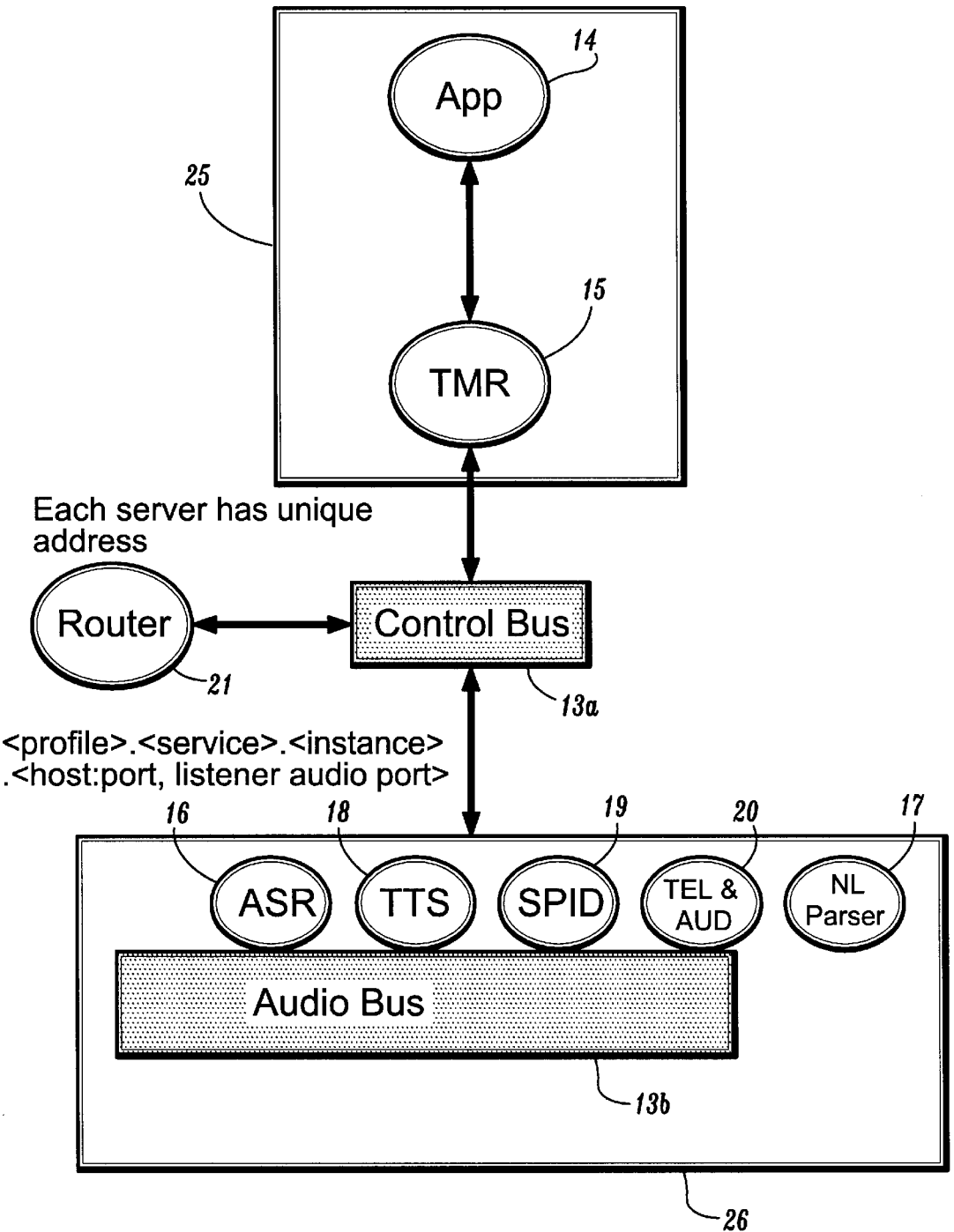
FIG. 2 is a block diagram of a speech processing system according to an embodiment of the invention.

FIG. 2 is a high-level diagram of an embodiment of the system of FIG. 1, which illustrates a method for sending audio and control messages between different components of the system 10. In FIG. 2, a client application 25 (comprising conversational application 14 and associated task manager 15), speech server 26 and router 21 exchange control messages via control bus 13a. The control bus 13a comprises the portion of the IP network 13 between ports that are assigned to control protocols. In one embodiment, the control bus comprises a collection of point-to-multi point connections that pass XML messages over TCP sockets, wherein the messages comprise strings with fixed length fields and a list of tag-value pairs. In this embodiment, the application 14 is programmed using, e.g., VoiceXML, FDM (form-based dialog management), C++, Java, scripts, and may comprise an XML parser.

The speech server 26 comprises a plurality of speech engines (ASR, TTS, SPID, and audio subsystem (comprising pre/post processors, codecs) which pass audio data over an audio bus 13b. The audio bus 13b comprises the portion of the IP network 13 between ports that exchange, e.g., RTP streamed audio to and from the TEL 20 system. The audio bus 13b comprises a collection of point-to-multi point connections passing audio and begin/end indicators. In one embodiment, TCP sockets are connected when speech begins and then terminate on the end of speech. RTP based audio exchanges may also be implemented.

In the system 10, audio streams are exchanged between the different speech servers, e.g., TEL 20, SPID server 19, TTS server 19, ASR server 16 (and other engines) and control messages are exchanged between the task manager 15, router 21, speech servers, and TEL 20 and between engines. The task manager 14 programs the engines using, e.g., SOAP/WSDL messages (as discussed below). The task manager maintains the context for engines that are programmed asynchronously by algorithm strings and are assumed stateless. Sockets and HTTP can be used for the messaging following the same principles.

Various protocols may be used for streaming audio and exchanging control messages. Preferably, the implementation of distributed conversational systems according to the present invention is based, in part, on a suitably defined conversational coding, transport and control protocols, as described for example in U.S. patent application Ser. No. 10/104,925, filed on Mar. 21, 2002, entitled "Conversational Networking Via Transport, Coding and Control Conversational Protocols," which is commonly assigned and fully incorporated herein by reference.

Briefly, in a preferred embodiment, distributed transport protocols comprise, for example, RT-DSR (real-time distributed speech recognition protocols) that implement DSR optimized and DSR non-optimized speech codecs. Such protocols are preferably VoIP-based protocols (such as SIP or H.323), which implement RTP and RTSP. Such protocols preferably support end-point detection and barge-in and exchange of speech meta-information such as speech activity (speech-no-speech), barge-in messages, end of utterance, possible DTMF exchanges, front-end setting and noise compensation parameters, client messages (settings of audio-sub-system, client events, externally acquired parameters), annotations (e.g. partial results), application specific messages. Such meta information can be transmitted out-of-band or sent or received interleaved with "audio in or "audio out" data. Furthermore, control protocols include session control protocols, protocols for exchanging of speech meta-information, and SERCP (speech engine remote control protocols). Preferably, SERCP is based on SOAP, using algorithm string instructions as described below. The engines are preferably programmed to listen for input, perform a particular task, and send the results to a particular port. Such protocols further provide control of the audio I/O system, such as programming a DTMF recognizer.

Furthermore, in a preferred embodiment, the routing functions are performed using SOAP messaging, as are the exchanges between engines. One or more ports of the audio I/O system are associated to an application. The engines are associated with applications on either an utterance, session or persistent basis. Each engine server registers its state with the router/load manager. The application sends request to the router/load manager (via the task manager) for a particular functionality or resource. As a result, the router/load manager passes the address of the engines to the task manager and the audio I/O system. The task manager ships SOAP instructions to the engines. The audio I/O system ships RTP audio to and from the engine address. After processing, the engines ship their results or RTP in the same manner. Preferred coding, transport and control protocols for implementation in a distributed telephony system according to the invention will be discussed in detail below with reference to FIG. 13, for example.

Figure 5:
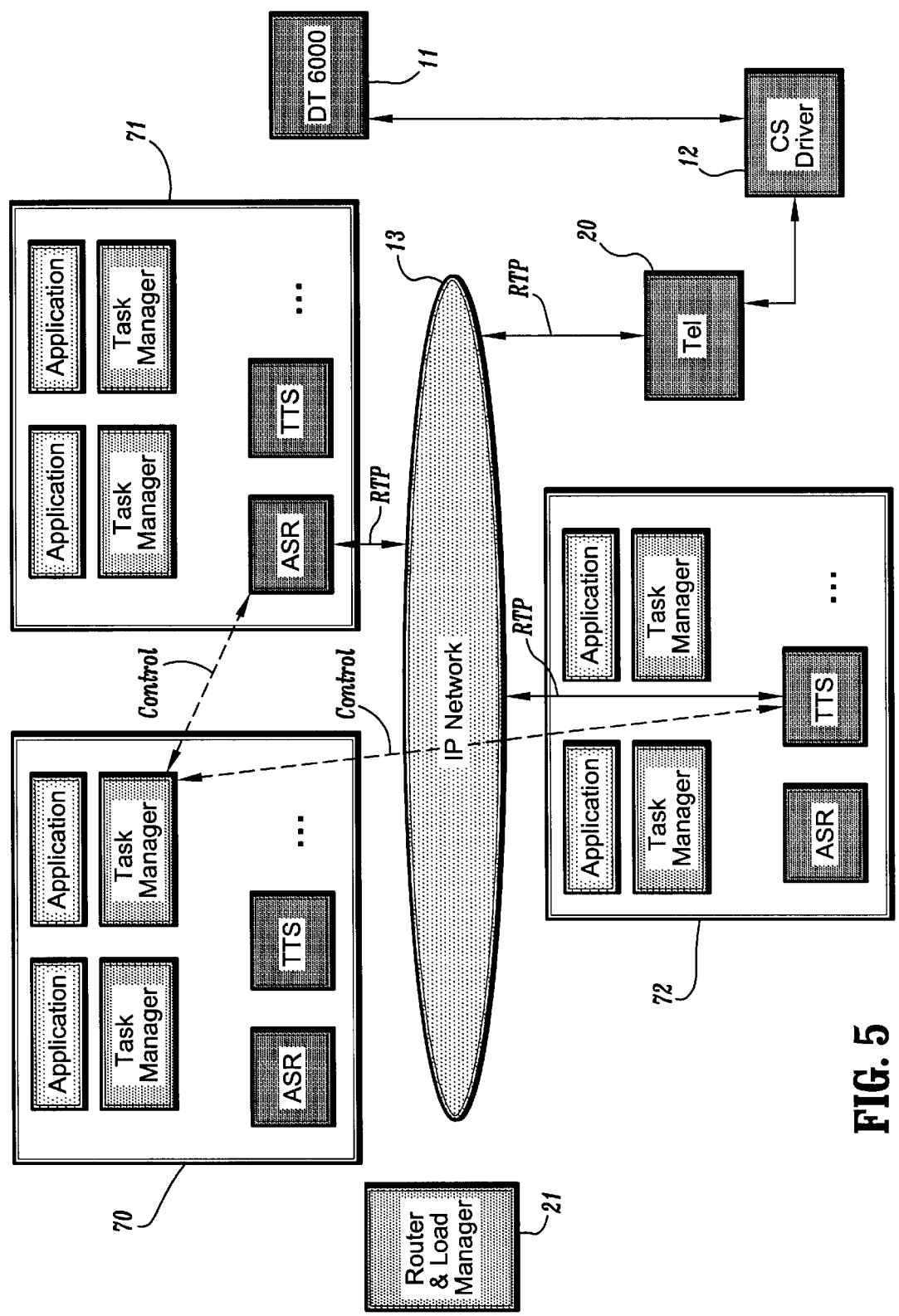
FIG. 5 is a block diagram of a speech processing system according to an embodiment of the invention.
Figure 6:
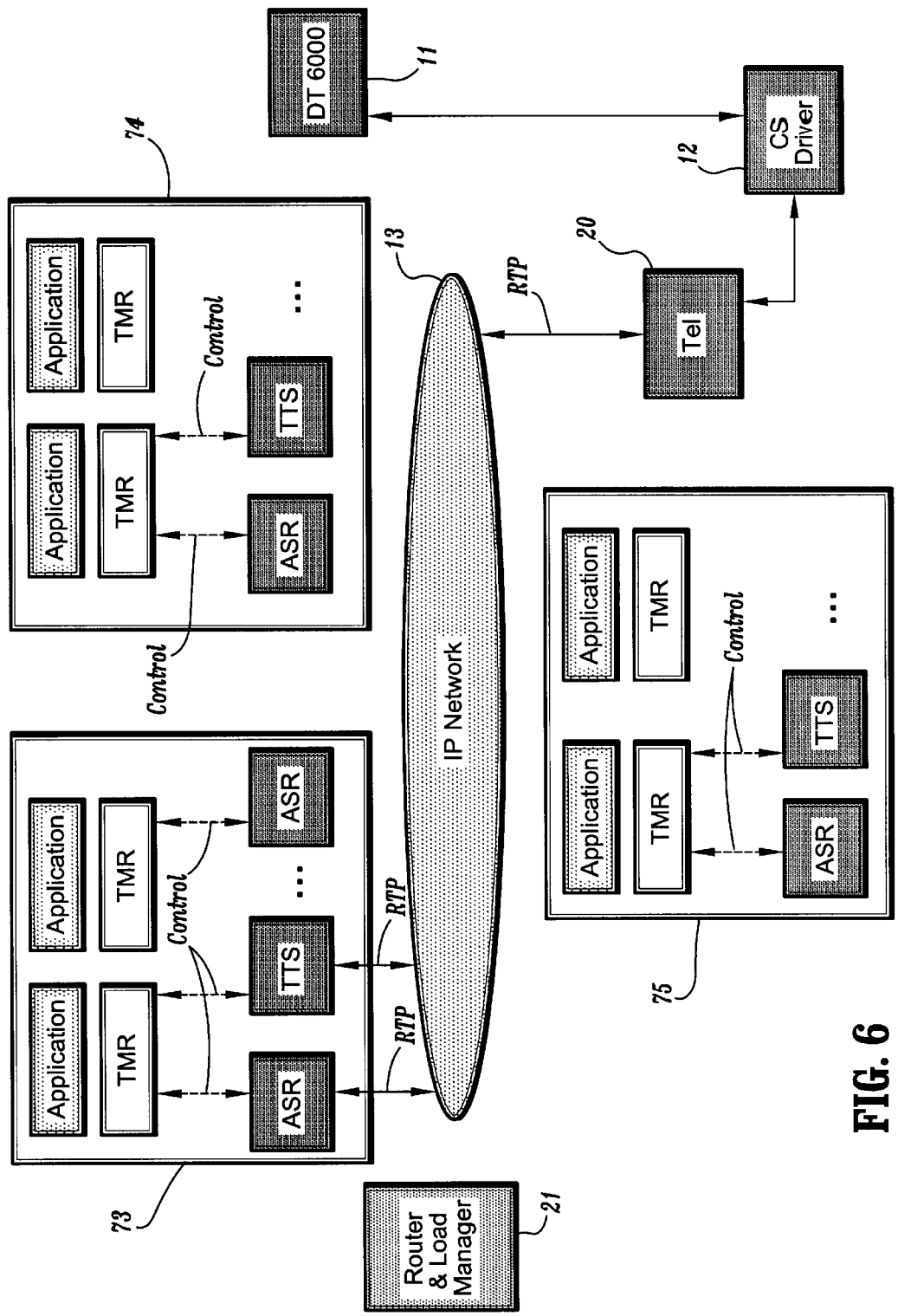
FIG. 6 is a block diagram of a speech processing system according to an embodiment of the invention.

FIGS. 5 and 6 are diagrams illustrating distributed systems/applications according to other embodiments of the invention. The architecture of the exemplary system depicted in FIG. 5 is similar to the system 10 of FIG. 1, except that the system comprises a plurality of client application hosts 70, 71, 72, each running a plurality of applications and associated task managers and speech engines. In the framework of FIG. 5, the router/load manager 21 can select any available speech engine across the different server/machines. For instance, as specifically depicted in FIG. 5, the task manager on remote host 70 can access and program the speech engines on remote hosts 71 and 72, as selected and assigned by the router/load manager 21.

The system architecture of FIG. 6 comprises a plurality of client application hosts 73, 74, 75, each running a plurality of applications and associated speech engines. In the framework of FIG. 6, the applications associated with a given host can use only those speech servers residing on the host. In FIG. 5, the task managers can control engines that are located on different machines networks. The task manager as such abstracts the engine control from the application. In the embodiment of FIG. 6, engines are on the same machine, cluster or network as the application. It is to be understood that when the engines are local, it is not necessary to have a task manager drive the remote engines through SERCP and the application can directly talk (via local APIs) to drive the local engines.

Figures 3A, 3B:
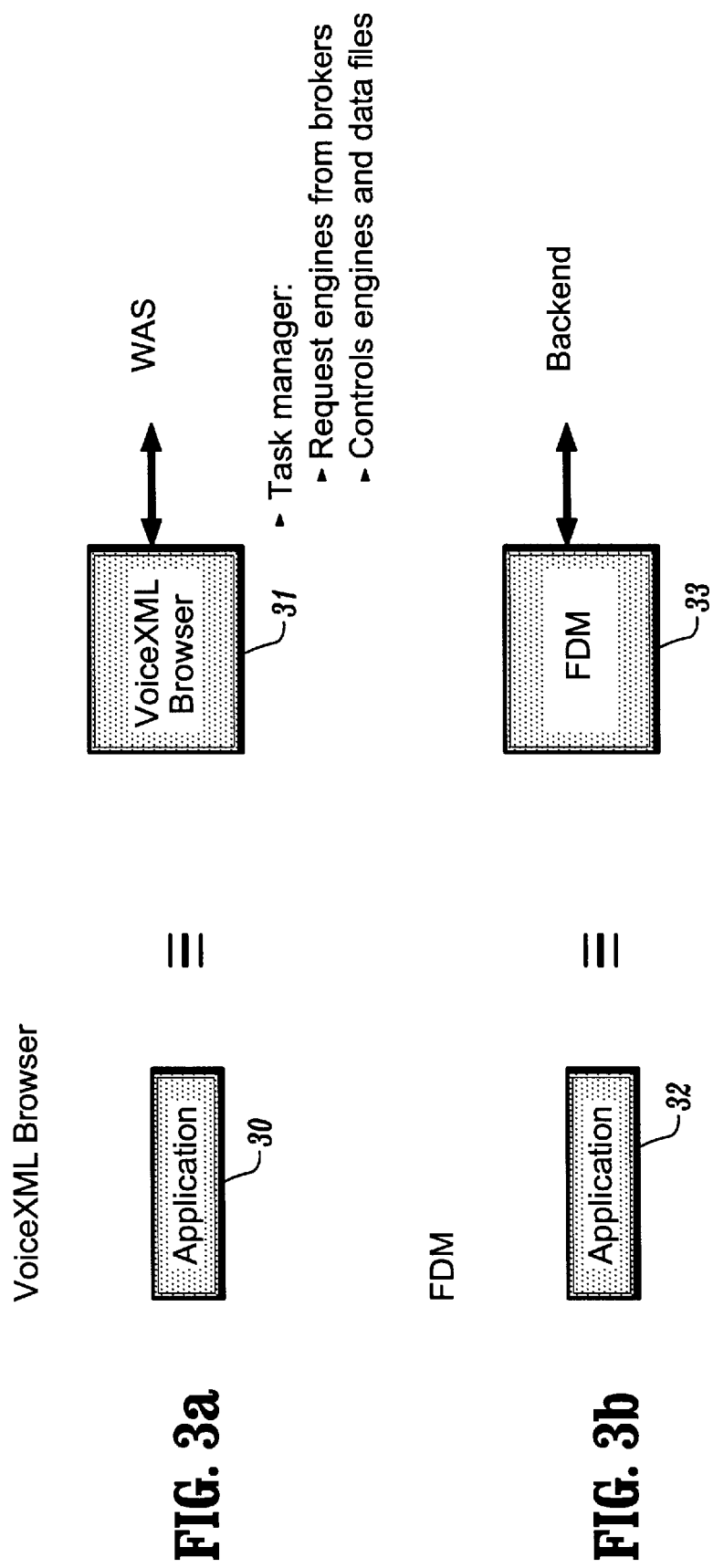
FIGS. 3a–3d are diagrams illustrating application frameworks that can be implemented in a speech processing system according to the invention.

The diagrams of FIGS. 3a, 3b, 3c and 3d illustrate various application programming frameworks that may be implemented in a telephony system according to the invention. It is to be understood that the conversational architectures described herein may be implemented using one or more of the following application authoring frameworks. In FIG. 3a, the application framework comprises a VoiceXML browser application which accesses and renders VoiceXML documents received from a WAS (Web Application Server) and which passes received data to the WAS for backend processing. Preferably, any suitable speech browser that is capable of processing VoiceXML scripts may be employed herein. A preferred embodiment of the VoiceXML browser 31 is described, for example, in the International Appl. No. PCT/US99/23008, entitled "Conversational Browser and Conversational Systems", which has been filed in the United States National Phase and assigned U.S. Ser. No. 09/806, 544, and which is commonly assigned an incorporated herein by reference. This application also describes a conversational markup language. A speech browser is preferably capable of parsing the declarative framework (including any imperative specification) of a VoiceXML page (or any other form of conversational ML) and render the conversational UI of the target content or transaction to a user.

The application framework illustrated in FIG. 3b comprises a FDM (form-based dialog manager) that manages a plurality of forms (e.g., scripts) and communicates with backend logic for processing the forms and accessing backend data. Any suitable form-based dialog manager, such as a web-based FDM, which employs NLU (natural language understanding) to provide a "free-flow" dialog, and which can operate in a distributed environment, may be implemented herein. In one preferred embodiment, techniques that may be used for providing NLU-based FDM are disclosed in the following references: Papineni, et al., "Free-flow Dialog Management Using Forms," Proc. Eurospeech, 1999; and K. Davies et al., "The IBM Conversational Telephony System For Financial Applications", Proc. Eurospeech, Budapest, 1999, which are incorporated herein by reference. In addition, the techniques disclosed in U.S. Pat. No. 6,246,981, issued to Papineni, et al., entitled "Natural Language Task-Oriented Dialog Manager and Method", which is incorporated herein by reference, may be used for providing NLU-based FDM.

Figure 3C:
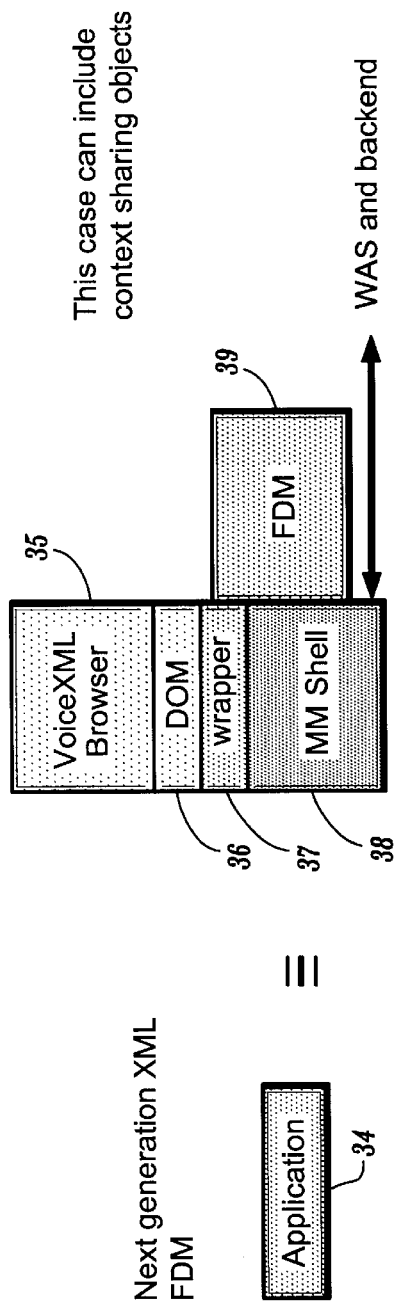

The application framework illustrated in FIG. 3c comprises an XML-based FDM application 34. The application 34 comprises a VoiceXML browser 35, a DOM (document object model) layer 36 (that provides at least access to the interaction events and allows update of the presentation (through page push or DOM mutation), a wrapper layer 37 a multi-modal shell 38 and FDM 39. In this framework, the FDM 39 uses the VoiceXML browser 35 for audio I/O management and speech engine functions. Following a Web programming model, the FDM 39 submits messages for backend calls and scripts. The multi-modal shell 38 supports launching of objects or managing the forms and sending snippets to the VoiceXML browser 35. It provides the line between the VoiceXML browser 35 and the FDM 39 for audio I/O and engine management. This application framework supports context sharing objects. The DOM layer 36 comprise supporting mechanisms for controlling the VoiceXML browser 35 and mechanisms for event notification. The wrapper 37 comprises an interface and filters to the VoiceXML browser 35 (e.g., the wrapper 37 implement a DOM filter and interfaces). The DOM implementation provides an efficient and universal mechanism for exchanging events and manipulation the presentation layer for existing VoiceXML browsers, without having to modify the code of such VoiceXML browsers. The application framework 34 and various functions and implementation of the DOM and wrapper layers are described in detail in U.S. patent application Ser. No. 10/007,092, filed on Dec. 4, 2001, entitled "Systems and Methods For Implementing Modular DOM (Document Object Model)-Based Multi-Modal Browsers", and U.S. Provisional Application Serial No. 60/251,085, filed on Dec. 4, 2000, which are both fully incorporated herein by reference.

Figure 3D:
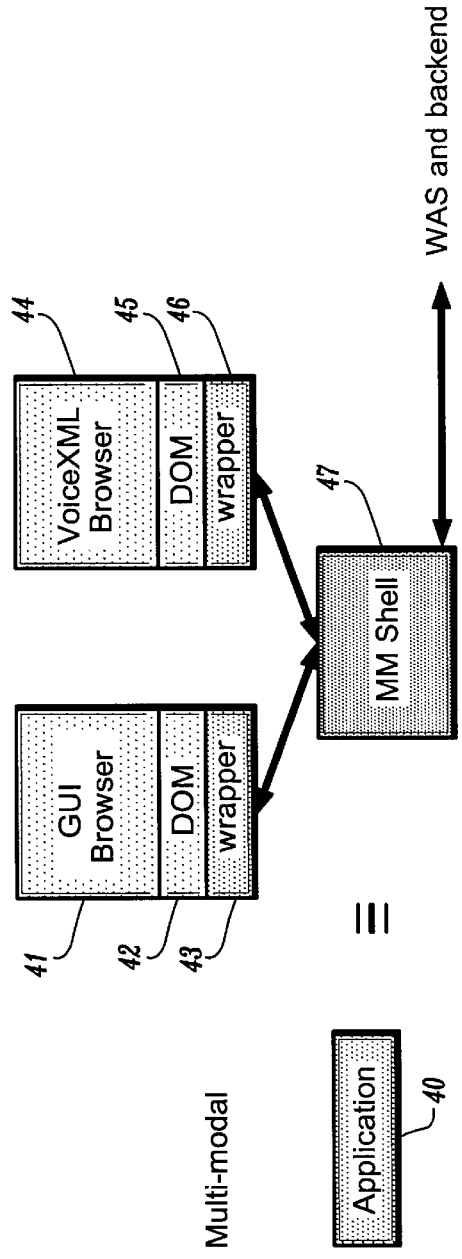

The application framework illustrated in FIG. 3d comprises a DOM-based multi-modal application 40. Various frameworks for application 40 are described in the above incorporated U.S. patent application Ser. No. 10/007,092 and No. 60/251,085. Briefly, the multi-modal browser application 40 comprises a multi-modal shell 47 that maintains the state of the application, manages the synchronization between the supported browsers (e.g., GUI browser 41 and VoiceXML browser 44), and manages the interface with the WAS and backend. The multi-modal browser application 40 comprises a GUI browser 41 and associated DOM interface 42 and wrapper layer 43, as well as a voice browser 44 and associated DOM interface 45 and wrapper layer 46. It is to be understood that notwithstanding that two channels are shown in FIG. 3d, additional channels can be supported (e.g., WML (wireless markup language, etc.) The DOM interfaces 42 and 45 preferably provide mechanisms to enable the GUI browser 41 and voice browser 44 to be at least DOM Level 2 compliant. The DOM interfaces 42 and 45 comprise supporting mechanisms for controlling the respective browsers (presentation update) and mechanisms for event notification and exchange.

Each wrapper 43 and 46 comprises interfaces and filters to the different views (browsers) (e.g., the wrappers implement a DOM filter and interfaces). The wrappers support granularity of the synchronization between the different channels by filtering and buffering DOM events. Further, the wrappers 43 and 46 preferably implement the support for synchronization protocols for synchronizing the browsers.

Instead of wrappers, it is possible to use other interfaces or mechanisms that rely on the same principles. For example, it is possible to load in the user agents (or in the pages) an ECMAScript library that capture DOM events that result from the user interaction and handle them by sending them to the multimodal shell.

The synchronization protocols implement the information exchange behind an MVC framework: when the user interacts on a View (via a (controller) browser), the action impacts the Model (supported by the multi-modal shell 41) that updates the Views. Preferably, the synchronization framework enables transport of DOM commands to remote browsers from the multi-modal shell and the transport of DOM events from the remote browser to the Multi-modal shell. The synchronization framework preferably enables page push instructions to remote browsers and can also enable DOM manipulation to update the presentation. Further, the synchronization framework preferably enables (i) status queries from MM Shell to the different views, (ii) status queries from views to MM Shell, (iii) registration of new views, (iv) discovery between the view and MM shell, (v) description and configuration of a new view, and (vi) clean disconnect of views from the Multi-modal shell. The synchronization framework preferably supports replication of the Multi-modal shell state. The synchronization framework clearly identifies the associated view (Channel type, User and Session). In other embodiments, the synchronization framework preferably supports negotiation on what component plays the role of the multi-modal shell and negotiation/determination of where to perform what function. The synchronization framework is compatible with existing network infrastructure/protocol stack and gateways, and the synchronization protocols can bind to HTTP (and similar protocols like WSP) and TCP/IP. Preferably, the synchronization fit the evolution towards web services; XML protocols.

It is to be appreciated and understood that the systems and methods described herein can support numerous runtime platform execution models and numerous programming model. Therefore, programming paradigms such as NL, Script, state table, java, VoiceXMl, single authoring and multiple authoring frameworks can be implemented in the systems described herein. For example, the present invention supports programming models that are premised on the concept of "single-authoring" wherein content is expressed in a "user-interface" (or modality) neutral manner. In particular, the present invention can support interaction-based programming models that separate application programming into content aspects, presentation aspects and interaction aspects. An example of a single authoring, interaction-based programming paradigm, that can be implemented herein is described in U.S. patent application Ser. No. 09/544,823, filed on Apr. 6, 2000, entitled: "*Methods and Systems For Multi-Modal Browsing and Implementation of A Conversational Markup Language*", which is commonly assigned and fully incorporated herein by reference.

As described in the above-incorporated U.S. Ser. No. 09/544,823, one embodiment of IML preferably comprises a high-level XML (eXtensible Markup Language)-based script for representing interaction "dialogs" or "conversations" between user and machine, which is preferably implemented in a modality-independent, single authoring format using a plurality of "conversational gestures." The conversational gestures comprise elementary dialog components (interaction-based elements) that characterize the dialog interaction with the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, for example, allows an application to be written in a manner which is independent of the content/application logic and presentation (i.e., gesture-based CML encapsulates man-machine interaction in a modality-independent manner).

The use of a single authoring, modality independent application (e.g., gesture-based IML as described above) together with a multi-modal shell in the application framework of FIG. 3*d* advantageously provides tight synchronization between the different Views supported by the multi-modal browser. Techniques for processing multi-modal documents (single and multiple authoring) via multi-modal browsers are described in the above-incorporated patent application U.S. Ser. No. 09/544,823, as well as U.S. patent application Ser. No. 09/507,526, entitled: "*Systems And Methods For Synchronizing Multi-Modal Interactions*", which is commonly assigned and fully incorporated herein by reference. These applications describes architectures and protocols for building a multi-modal shell.

Figure 4:
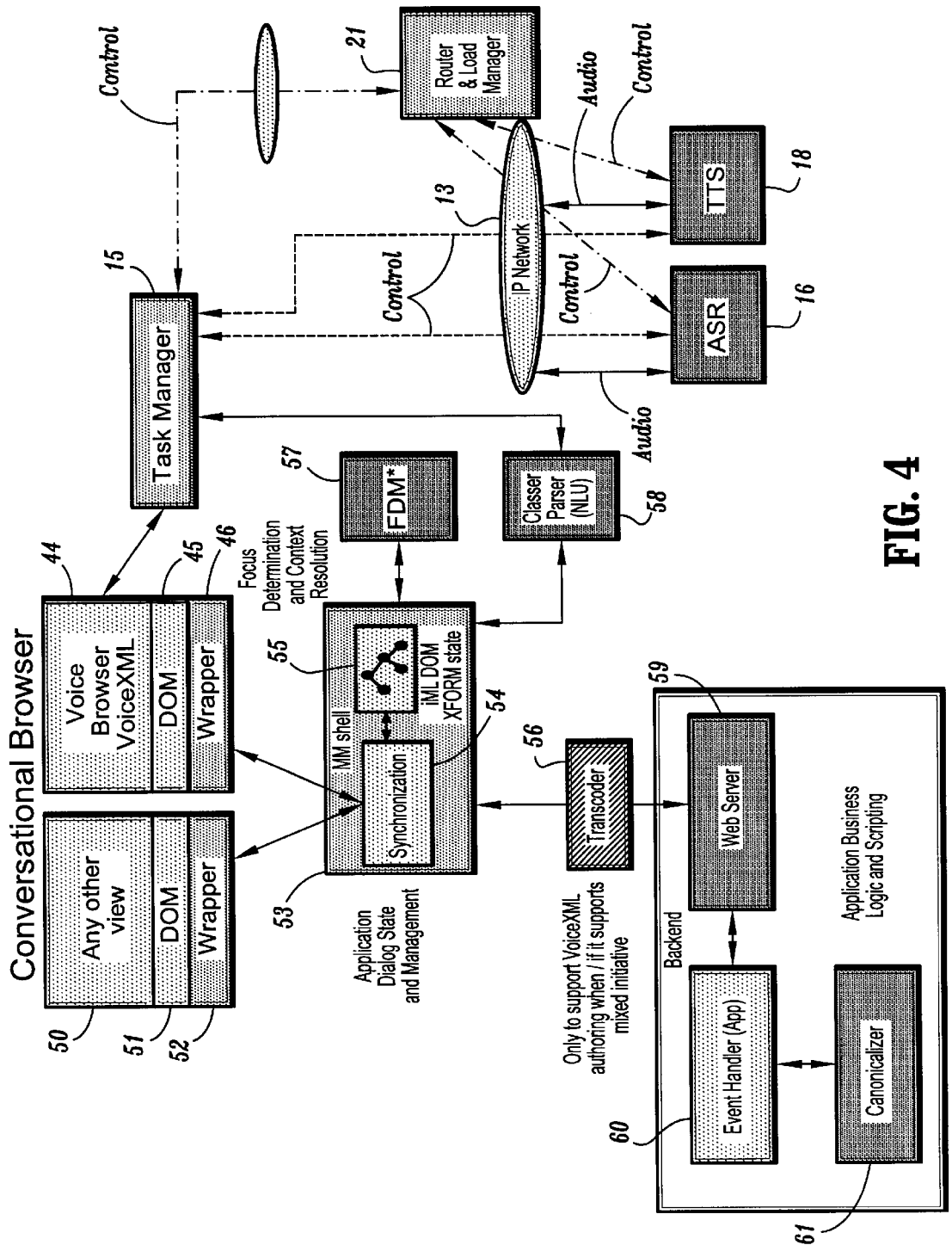
FIG. 4 is a block diagram of a speech processing system according to an embodiment of the invention, which uses a conversational browser.

FIG. 4 is a block diagram of a conversational system according to an embodiment of the present invention which implements a DOM-based multi-modal browser and NLU to provide "free-flow" or conversational dialog (details of which are disclosed in U.S. patent application Ser. No. 10/156,618, filed May 28, 2002, entitled: "*Methods and System For Authoring of Mixed-Initiative Multi-Modal Interactions and Related Browsing Mechanisms*," which is commonly assigned and incorporated herein by reference. The task manager 15, router 21, ASR 16, TTS 18 and network 13 interface and communicate as described, for example, with reference to FIG. 1. The exemplary system comprises a multi-modal browser comprising the VoiceXML browser 44 and associated interfaces 35, 46, an additional view (GUI, WML, etc.) 50 and associated interfaces 51, 52, and a multi-modal shell 53. The multi-modal shell 53 coordinates and synchronizes (via synchronization module 54) the information exchange between the registered channel-specific browser applications 44 and 50 (and possibly other views) via synchronization protocols (e.g., Remote DOM or SOAP). The multi-modal shell 53 interacts with backend logic comprising Web server 69, Event Handler 60 and canonicalizer 61. The multi-modal shell 53 parses a multi-modal application/document received from the WAS 59, and builds the synchronization between the registered browser applications via a registration table 55 (e.g., an interaction logic layer DOM Tree and associated instances that include the data model and interaction, and possibly, the interaction history) and then sends the relevant modality specific information (e.g., presentation markup language) comprising the multi-modal application/document to each registered browser application for rendering based on its interaction modality. A transcoder 56 enables the conversion of, e.g., IML scripts to VoiceXML scripts 32 and other scripts supported by the multi-modal browser. A FDM 57 is accessible by the multi-modal shell 53 to perform functions such as focus determination and context resolution. A NLU system 58 that provides NL parsing/classification enable the generation of semantic representations of spoken utterances and, thus, free-flow, mixed initiative dialog.

Figure 7:
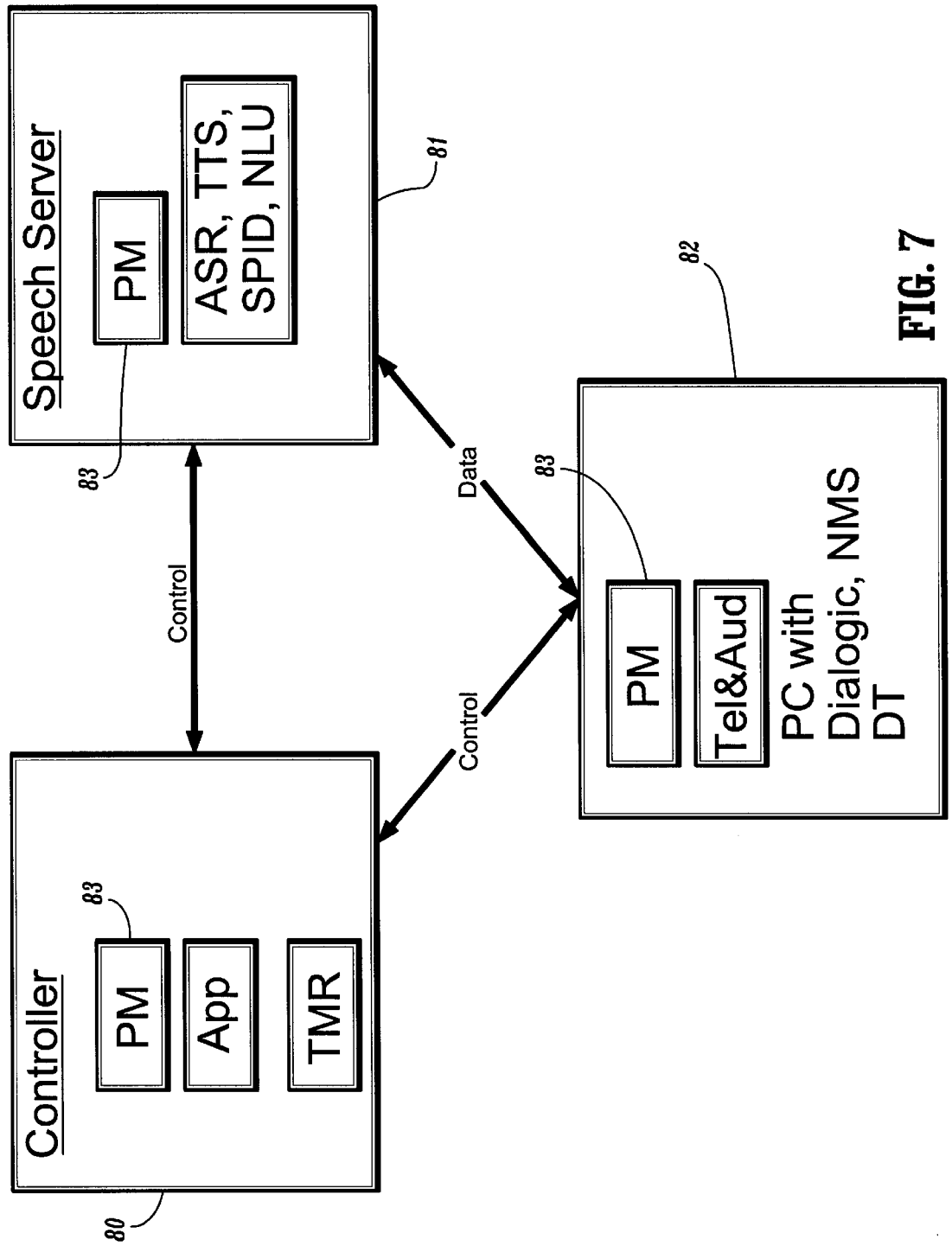
FIG. 7 is a block diagram of a speech processing system according to an embodiment of the invention.
Figure 8:
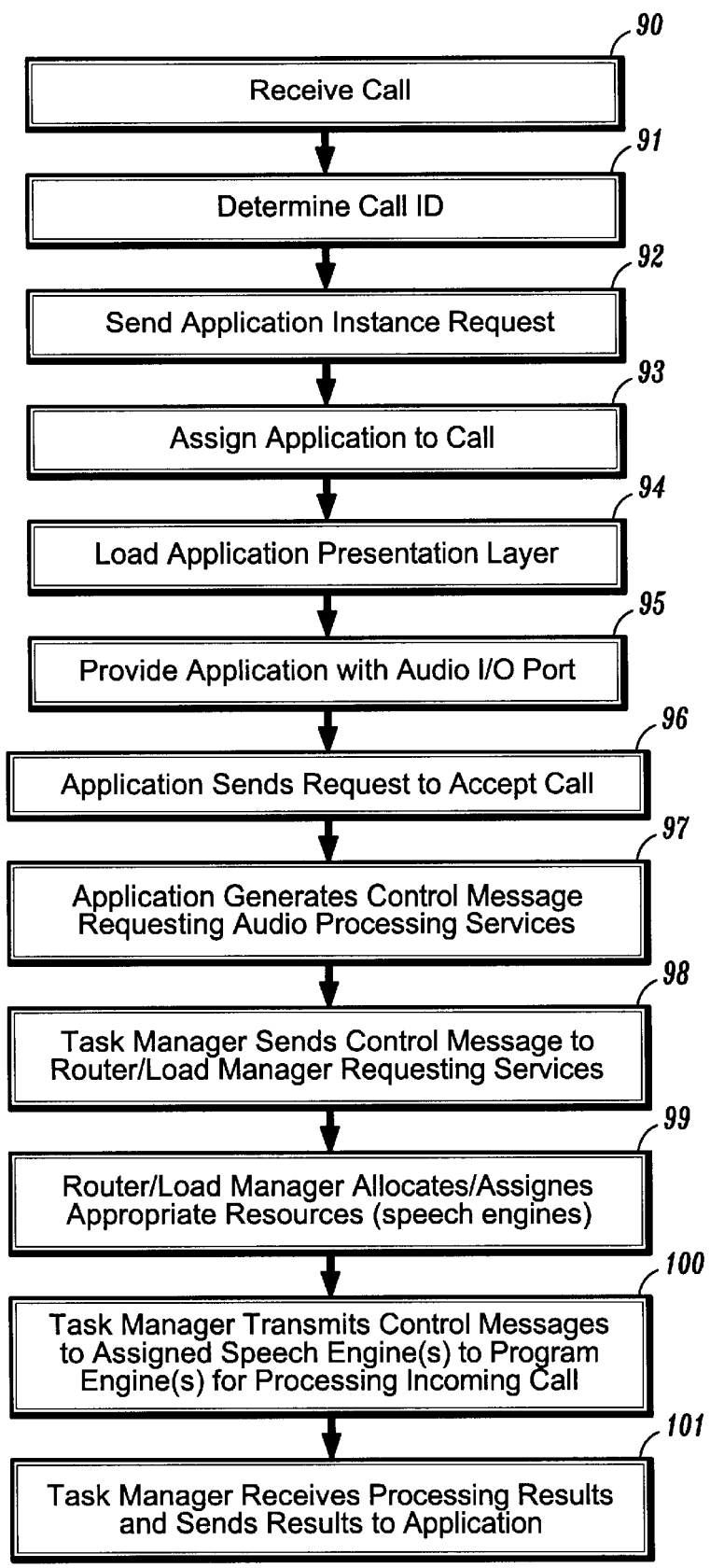
FIG. 8 is a flow diagram of a method for processing a call according to one aspect of the invention.

FIGS. 7 and 8 are diagrams illustrating methods for processing a call in a telephony system according to an embodiment of the invention. More specifically, FIG. 7 is a high-level diagram illustrating methods for initiating a conversational system according to an embodiment of the invention, as well as the flow of audio and control messages between components of the conversational system. FIG. 8 is a flow diagram illustrating methods for processing a call or incoming voice communication (i.e. start of a new voice session). The diagram of FIG. 7 illustrates various telephony components comprising a controller 80, speech server 81 and audio I/O source 82. Each system component 80, 81 and 83 can reside on a separate machine. For instance, the audio I/O source (comprising the TEL) may reside on a PC having client application enabling software (e.g., Dialogic, NMS, DT). The controller 80 (which comprise the conversational application (App) and task manager (TMR) may reside on a remote machine over a network and the speech server 81 (which comprises speech engines ASR, TTS, SPID, NLU and other processing engines, if needed) may reside a separate remote machine over the network. As illustrated, control messages are passed between the controller 80 and TEL host 82 and between the controller 80 and speech server 81, using control messaging protocols as described herein. Further, audio data is streamed between the TEL host 82 and the speech server 81, using RT-DSR protocols as discussed herein.

Each host 80, 81, 82 comprises a PM (process manager) 83 for initializing the conversational system. Each process manager 83 comprises a daemon that is installed on each machine, which is launched when the machine is booted or rebooted to initiate the different components. In one embodiment, the PM is installed as a deamon (per host, without remote access). There are various processes that are launched at initiation. For instance, the process manager launches a router. For a router on a client, a one-to many configuration is initiated. For a router on a server, a many-to many configuration is initiated. The client is configured with a list of routers, and selected according to a predefined scheduling scheme. Another process relates to server activity. The process manager launches a server and the server connects to a well-known router port from the configuration. The server will send a registration message to the router (travel.asr.0.hosty:222:333). Another process relates to client activity. When a client is launched, a ClientRouter Object is launched and processed. The router will notify the ClientRouter Object of what resources are available (darpa.asr, us.tts . . . ). The ClientRouter Object can request a server of a particular type. Each application will register with the router (via the task manager) the application type and the application's Call ID.

Methods for processing an incoming call will now be discussed with reference to the system of FIG. 1, as well as the flow diagram of FIG. 8. Initially, a call (new incoming voice communication, i.e., establishment of a new voice session which, in telephony is a call and which on VoIP, could be a SIP session, etc.) is received by the client voice response system 11 (step 90). The client determines a Call ID based on, e.g., the configuration (e.g., number to application mapping, application profiles, state tables, the telephone number dialed, etc). Call control exchanges/signaling occur to pass the incoming call information (e.g., Call ID, IP address, etc.) from the client 11 to the Tel 20 via the driver 21 (step 91). The TEL 20 sends an application instance request (with Call ID, address) to the router/load manager 21 (step 92). The router/load manager 21 attempts to find and assigns an application that can take the call (step 93).

When the application is assigned, an application presentation layer is loaded (via a backend access) (step 94). The router/load manager 21 then passes to the application 14 (via the associated task manager 15) the appropriate TEL address for, e.g., the duration of the call (session based) (step 95). The application then sends a message (via the task manager) to the TEL 20 to accept the call (i.e., the Tel ID is initiated) (step 96).

The application then sends an XML control message to the task manager (using, e.g., SOAP) requesting certain functionalities (e.g., "tts"get id", asr "digits.fsg, dtmf"term#"), which is parsed by the task manager to determine what type of servers/data files are needed based on the application request (step 97). Based on the application request, the task manager sends a control message to the router 21 requesting addresses for the requested speech services (e.g. TTS, ASR, and/or data files (grammers, vocabularies, ect., pointed to by URL) (step 98). The router 21 will then assign the requested resources that are available, and provide the task manager the appropriate address to such resource (step 99).

The task manager 15 will then transmit control messages to the assigned speech engines to program the speech engines (step 100). For instance, based on a request from the application, the task manager will request the TTS server to synthesize a particular prompt and stream the synthesized audio to the assigned TEL port. In addition, the task manager may request the ASR server to load data files (local or remote (URL)), enable a grammer to recognize digits (e.g., "digits.fsg"), listen on a particular TEL port and obtain audio data from the TEL port. The task manager may instruct the TEL to playback a TTS stream or prerecorded file from a particular socket, record to an ASR port, and collect DTMF digits with a # termination. The task manager will wait for all three responses (TTS, ASR, DTMF) to come back with a status before the application gets the results (step 101).

When the TTS prompt is played back to the user, the user may utter a spoken command or input data voice. The utterance is directed to the TEL via the driver and the incoming audio is streamed from the TEL 20 to the ASR over the IP network. The audio stream is processed and the results are returned to the task manager and then to the application. Assuming the application comprises a voice browser or multi-modal browser, the application processes the results and possibly performs a backend access (via WAS) to, e.g., receive the next VoiceXML page. Based on the application flow, the application may generate a control message to request an engine update, which is then sent to the router (via the task manager) to obtain addresses of additional resources needed for executing the application. Barge-in and other events may result into interrupting the prompt and restarting a ASR engine. Speech detection, etc., can be treated as other engines or settings of a particular engine (as discussed below).

In the case where the application comprises a free flow conversational application, the appropriate NL parser will also be assigned by the router (based on application request) and controlled by the task manager to process the speech recognition results provided by the ASR.

It is to be appreciated that complete control of the I/O channel and speech services can be achieved by submitting messages that define treatment of "audio in", "audio out", "control in" and/or "control out".

The speech engines and audio source are preprogrammed by the task manager/controller using such message. Programming the speech engines and audio source comprises, e.g., associating the engines to the next "ttl" (time-to-live) audio (wherein "ttl" is defined as utterance, session or persistent), negotiating the uplink and downlink codecs when an audio connection is established (e.g., between TEL and ASR), and programming engines (e.g., via WSDL) to load a context that specifies how to process the next incoming audio stream (e.g., what data files should be used, how to format the results and where to send the results).

In preferred embodiments, the conversational system is capable of detecting the beginning of speech. If the uplink codec (or another processor on Tel, before or after Tel) is programmed to perform end-point detection, a begin of speech signal is sent by the audio source (via a control channel) to the associated engine. If the engine is expected to perform the task, the audio is immediately streamed to the engine. The engine is expected to use a codec that may include other features like zero-crossings and other energy parameters. The source buffers incoming audio (circular) to handle a codec switch upon speech detection. Upon detection of beginning of speech, the codec is switched to a DSR codec (if DSR optimized codecs are used) otherwise, the appropriate conventional codec (e.g. AMR or G7.11) is selected (this can be done via a SIP/SDP negotiation as discussed below with reference to FIG. 13, for example) and an RT-DSR (defined as RTP stream of encoded speech encoded as DSR optimized payload or with conventionally encoded speech) is streamed to the engine.

The engine will process the incoming RT-DSR stream. The results are sent to the controller (e.g., task manager). The controller then programs next prompts and loads context in associated TTS engines. If a newly assigned, the TTS engine will establish a connection with audio I/O source. The prompt generated by the TTS is downlink encoded and streamed to the appropriate TEL sink and decoded at the I/O source.

Preferred conversational systems according to the present invention preferably support barge-in. For instance, as a prompt is being played back to a caller, if a new incoming speech is detected at the audio source, the TEL will stop the playback and notify the TTS engine to stop generating and streaming prompt, wherein such notification can be performed via call control channel, e.g., preferably through a SOAP (asynchronous) message/event that the TTS engine has been preprogrammed to handle, or a SOAP RPC call to the TTS engine ID (e.g. WSDL). The TEL will then notify the assigned ASR of the beginning of speech and start streaming (uplink encoded) audio in a previously negotiated format. It is possible that the configuration (established with, e.g., WSFL (as described below)) between the engines will allow this notification to directly propagate from the TTS engine to the ASR. In practice also, TEL will notify the ASR engine at the same time or even before notifying the TTS engine and start streaming input speech to the engine.

In most circumstances, the audio channel is used in half-duplex mode. Indeed, even with barge in, the speech recognizer will become active only on upon detection of speech and the speech synthesizer is preferably cut off as soon that incoming speech is detected. The audio channel may operate in full duplex mode only in between end point and barge-in notifications coming from the remote engines, if remote end point detection is used.

It is to be appreciated that several engines can act simultaneously on the same audio stream. For example, speech recognition and speaker verification engines can be exercised at the same time on the same utterance. In that case, the boundaries of both sessions input are determined by begin and end of speech markers. Depending on the technology, it is possible to share the DSR audio stream between the different engines, if they use the same acoustic front-end/DSR codec. Alternatively, different stream encoded with differently negotiated codecs can be simultaneously streamed to different engines.

In further embodiments, the detection of DTMF in the audio stream preferably stops any pending conversational engine sessions that would process the associated audio channel during these time intervals. DTMF data is then passed to the application/task manager via other protocols. This approach supports cases where a user mixes speech input and DTMF input.

Preferred conversational frameworks exchange of barge-in and end-point information: begin and end of input speech. Such information may be embedded in the audio streams using, e.g., the payload header of the RTP stream or using the associated RTCP stream, in a SOAP exchange either in or out of band, etc. In other embodiments, the call control protocol channel is used to transmit such information. Accordingly, upon notification of incoming speech (barge-in), the TEL may buffer or disregard any incoming audio from the TTS engine and the TEL may stop feeding the RTP stream to an ASR engine upon reaching end of speech. Conversely, the ASR engine can also notify the TEL that it has finished recognizing. The TTS engine should receive an indication of begin of speech on barge-in to stop synthesis (the TEL can stop passing audio out, but continuing synthesis after barge-in is wasteful of CPU and blocks the TTS resource). The reservation of engines associated to a call can be done on an utterance basis (reallocated after each turn) or on a session basis.

In the embodiment discussed, for example, in FIG. 1, the TEL system 20 comprises an advanced audio card and associated DSP and audio processing components. In other embodiments where the application comprises an IVR programmed using state tables and java beans, the TEL system is part of a custom server for the IVR that is controlled by the IVR. FIGS. 9 and 10 are block diagrams illustrating systems according to embodiments of the invention comprising IVR applications programmed using state tables and Java beans (existing IVR having applications written for its platform). The system 10a of FIG. 9 is similar to the system 10 of FIG. 1, except that the system 10a comprises a custom server 111 and a dedicated task manager 110. The custom server 111 serves several purposes. For instance, the server 111 it behaves as the TEL system 20 and the server 111 converts state table (IVR proprietary programming instructions) into instructions that the task manager understands and similarly converts back the results. Applications written for the IVR on top of the state tables (i.e., state table, Java beans, VoiceXML etc . . . ) are therefore able to run in the same environment with the same architecture.

Figure 9:
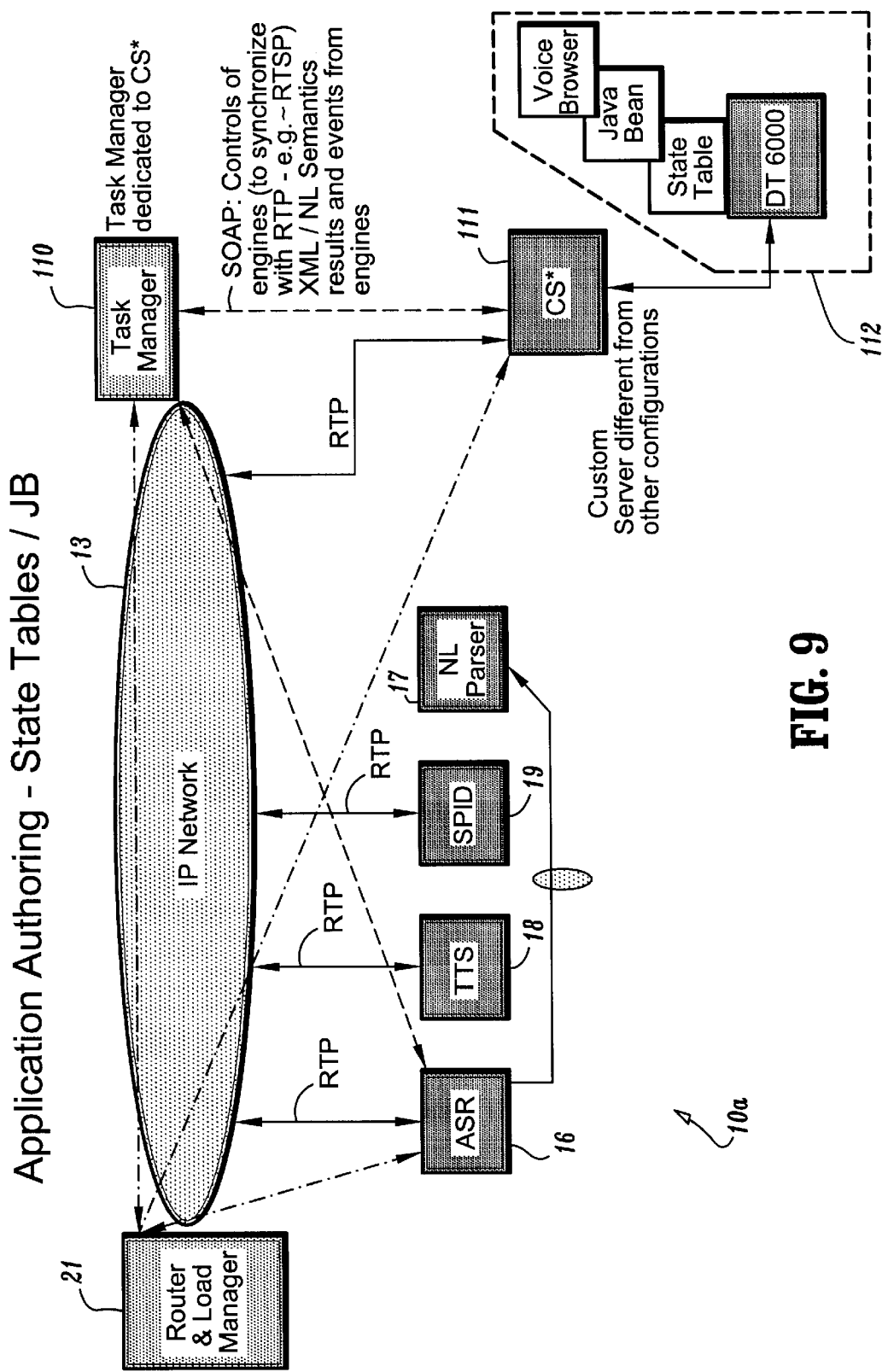
FIG. 9 is a block diagram of a speech processing system according to an embodiment of the invention.
Figure 10:
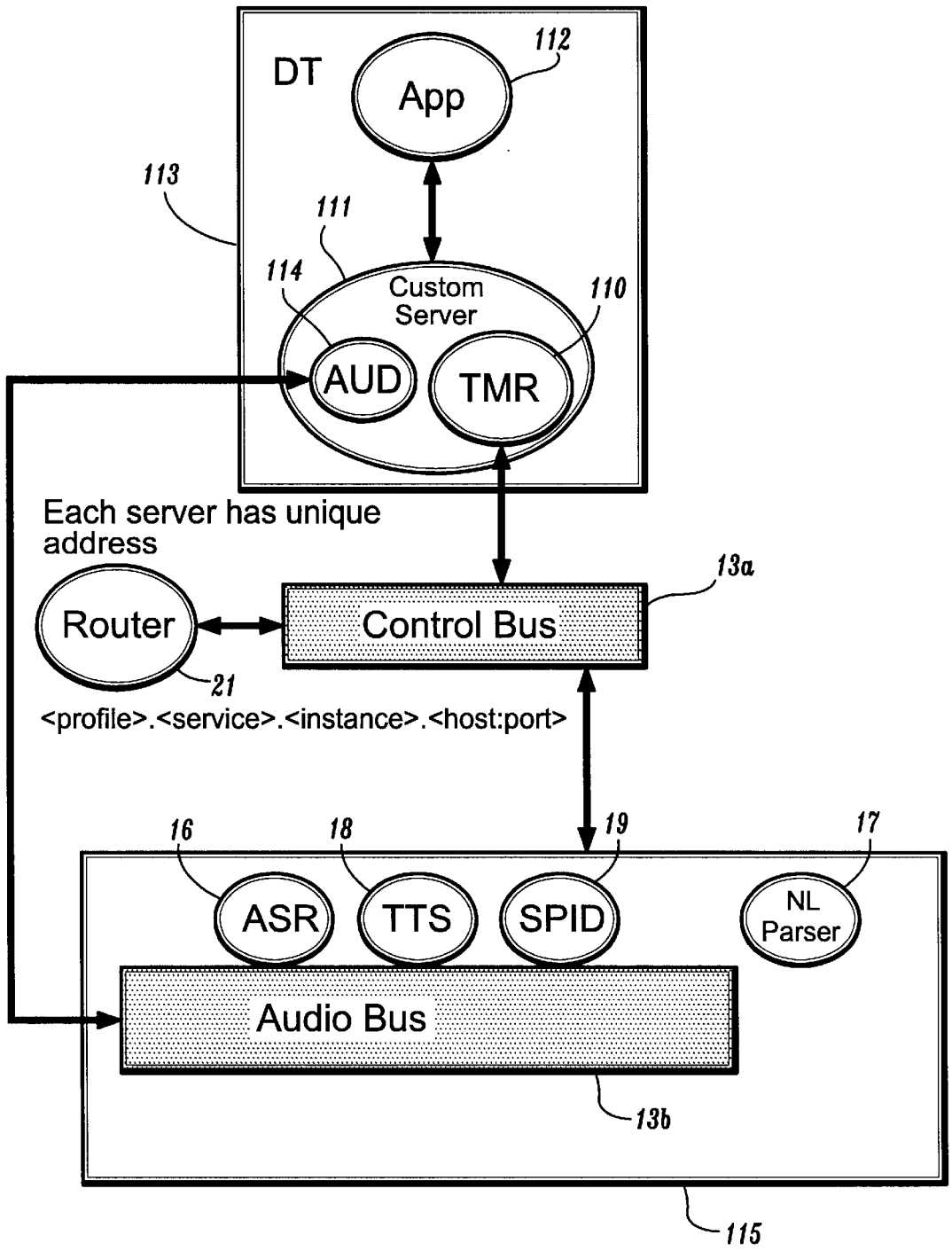
FIG. 10 is a block diagram of a speech processing system according to an embodiment of the invention.

FIG. 10 is a high-level diagram of an embodiment of the system of FIG. 9, which illustrates a method for sending audio and control messages between different components of the system 10a. In FIG. 10, a client application 113 (comprising telephony application 112 and associated custom server 111), speech server 115 and router 21 exchange control messages via control bus 13a. As noted above with reference to FIG. 2, the control bus 13a comprises the portion of the IP network 13 between ports that are assigned to control protocols. In one embodiment, the control bus comprises a collection of point-to-multi point connections that pass XML messages over TCP sockets, wherein the messages comprise strings with fixed length fields and a list of tag-value pairs. In this embodiment, the application 112 is programmed using state tales and/or Java beans and the custom server 111 communicates with the task manager 110 using, e.g., SOAP, and comprises an XML parser. The task manager 110 comprises a library. The AUD component 114 provides end of speech detection and optional begin of speech detection. The TEL is directly handled by the IVR application 112.

The speech server 115 comprises a plurality of speech engines (ASR, TTS, SPID, etc.) which pass audio data over an audio bus 13b. The audio bus 13b comprises the portion of the IP network 13 between ports that exchange, e.g., RTP streamed audio, and begin/end indicators. The audio bus 13b comprises a collection of point-to-multi point connections passing audio and begin/end indicators. In one embodiment, TCP sockets are connected when speech begins and then terminate on the end of speech.

Figure 11:
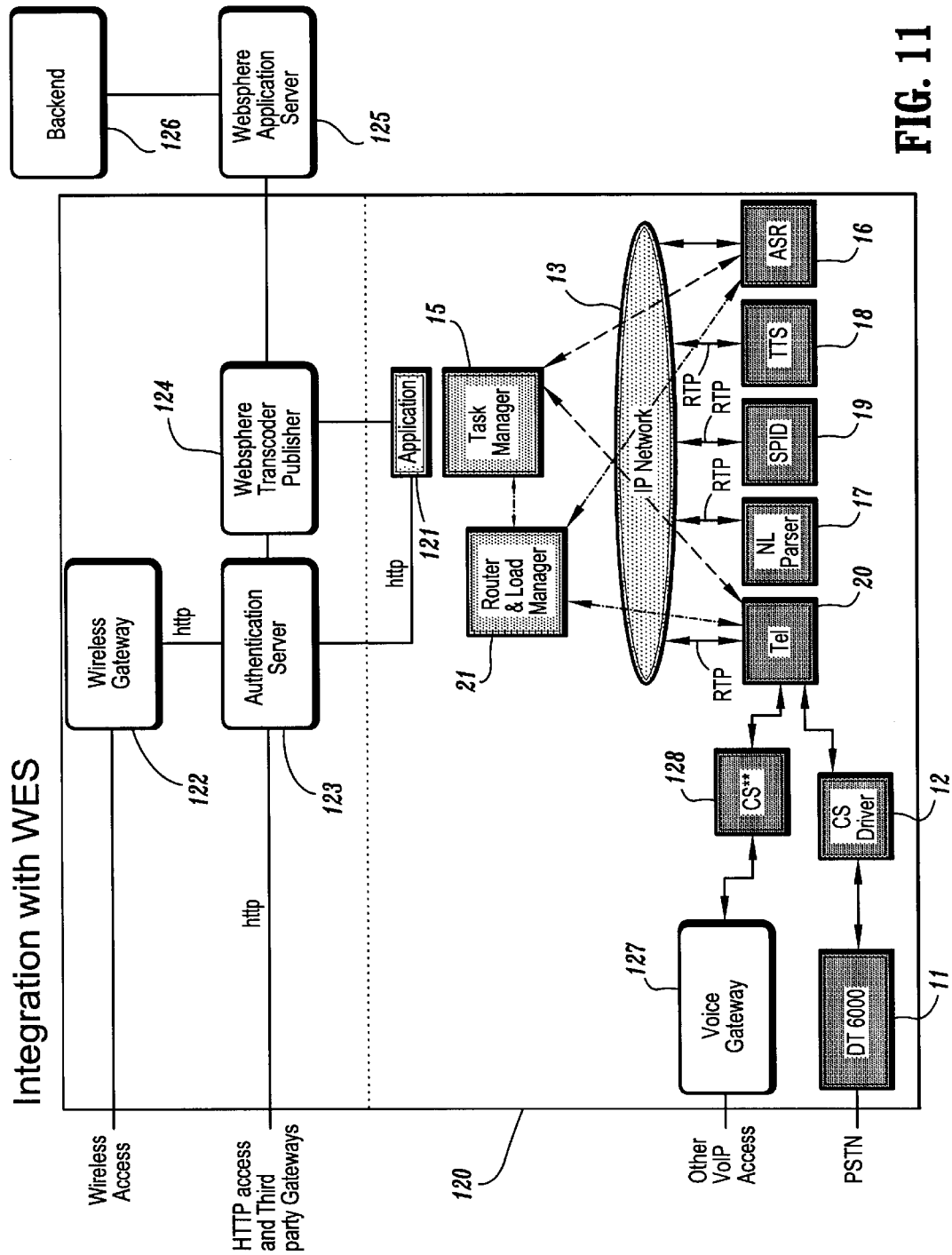
FIG. 11 is a block diagram of a speech processing system according to an embodiment of the invention.

FIG. 11 is a block diagram of a telephony system according to another embodiment of the present invention. The telephony system 120 in FIG. 11 is a system that is integrated with IBM's Websphere® Every Place Suite (and subsequent products and portal products) infrastructure to provide multi-channel or multi-modal applications. WebSphere® Everyplace Suite is a server software that allows easy development, management, and delivery of Web and enterprise applications to a variety of devices, including wireless handsets, PDAs and other Internet appliances.

The system 120 enables access by various communication channels including wireless access (via gateway 122), HTTP access and other gateways (via authentication server 123), VoIP access (via voice gateway 127 and associated custom server 128) and PSTN access (via, e.g., DT/6000) as discussed above. The system 120 comprise WebSphere Transcoding Publisher 124 to automatically "translate" data into an appropriate format that can be read from a device to which the data is being sent. The WebSphere® Transcoding Publisher 124 is a server-based, software that dynamically translates Web content and applications into multiple markup languages and optimizes it for delivery to mobile devices, such as mobile phones, and handheld computers. This solution helps to bridge data across multiple formats, markup languages and devices. the Transcoding Publisher 124 adapts, reformats, and filters content to make it suited for pervasive computing, giving companies get better access to customers, business partners and mobile employees on a variety of devices.

A multi-modal application 121 preferably supports all of the application environments discussed above with reference to FIGS. 3a–3d and FIG. 4 (except state tables). The application 121 comprises a multi-modal shell to provide data synchronization capabilities to keep data current across multiple devices and Wireless Application Protocol (WAP) functionality for wireless Internet access. A web application server 125 and backend 126 provide the necessary pages (IML, VoiceXML, HTML, etc) and business logic/scripts for processing and retrieving data.

It is to be appreciated that the conversational systems described herein are based on a conversational application framework (CAF) as described in U.S. patent application Ser. No. 09/896,057, filed on Jun. 29, 2001, entitled: "*System and Method For Providing Dialog Management and Arbitration in a Multi-Modal Environment*," which is commonly assigned and incorporated herein by reference and on the frameworks described in the above-incorporated application Ser. No. 10/156,618. CAF comprises a set of collaborating components that enable the development of conversational applications. For example, the CAF comprises components that interface with various engines and exposes their underlying functionalities. The CAF comprises components that provide the necessary I/O abstraction for the devices on which it is deployed. As such, conversational systems according to the invention may implement a DMAF (dialog manager and arbitrator facade) that provides an interface between conversational applications and the CAF. A CAF framework supports the conversational computing programming model by separating application content (business logic and backend access) from user interaction, as described in the above incorporated U.S. patent application Ser. No. 09/544,823.

In one preferred embodiment wherein the CAF is implemented in Java and its services are bound to a Java Virtual Machine (and, possibly, additional native OS services), the CAF may be implemented using a conversational virtual machine (CVM), as described in International Appl. No. PCT/US99/22927, filed on Oct. 1, 1999, entitled: "*Conversational Computing Via Conversational Virtual Machine*" (which was filed in the United States National Phase and assigned U.S. Ser. No. 09/806,565), which is commonly assigned and fully incorporated herein by reference. This application describes various architectures of a CVM (conversational virtual machine) that exposes conversational APIs (application program interface), conversational protocols and conversational foundation classes to application developers. CVM provides a kernel layer that is responsible for implementing conversational computing by managing dialog and context, conversational engines and resources, and conversational protocols/communication across platforms and devices having different conversational capabilities to provide a universal CUI (conversational user interface). A CVM may be implemented as either a stand-alone OS (operating system) or as a platform or kernel that runs on top of a conventional OS or RTOS (real-time operating system), possibly providing backward compatibility for conventional platforms and applications.

Transport, Coding and Control Conversational Protocols

The following section describes preferred DSR (distributed speech recognition) protocols that are used in a distributed conversational system according to the invention. Such DSR protocols include coding and transport protocols for coding/decoding audio data and real-time transport of encoded audio data, session control protocols for controlling uplink and downlink communications and speech engine remote control protocols (SERCP) for controlling speech engines. Preferred DSR frameworks for distributing the audio subsystem and speech services in a client/server environment are described in the above-incorporated U.S. patent application Ser. No. 10/104,925, and will be further described herein.

A DSR protocol stack is preferred to support deployment of conversational solutions where speech engines can be distributed over a network. A DSR protocol stack enables the application developer or service provider to seamlessly use remote engines. The location of the engines is not important, and the system operates as if the engine was local to the application at runtime, wherein the performance of the engines are not affected by presence of the network and the functionality of the engines are at least equivalent to local engines.

Figure 12:
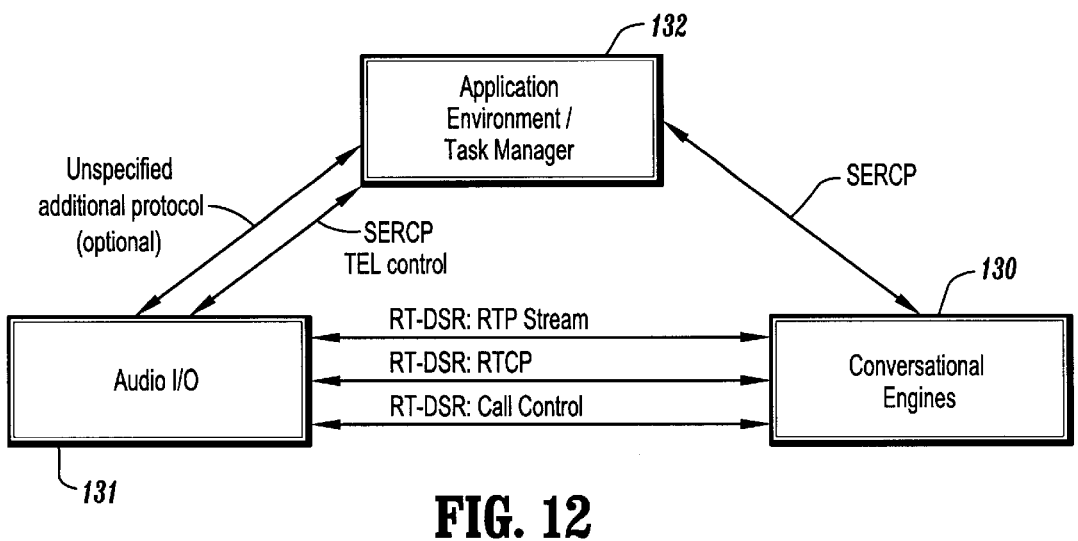
FIG. 12 is a block diagram of a speech processing system according to an embodiment of the invention.

FIG. 12 is a high-level diagram illustrating a system and method for implementing a preferred DSR framework using real-time DSR protocols (e.g., RTP audio streams, RTCP control streams, call, session and speech meta-information and control streams (e.g., SOAP over SIP session)) and a SERCP for remote control of speech engines. A preferred DSR framework is one in which the audio-subsystems and applications are designed to use SERCP as a mechanism to allocate and program distributed speech engines and enable network and system load management. SERCP is preferably implemented for multi-modal applications and other applications that require remote control of speech engines, as described herein.

The framework of FIG. 12 is one embodiment for implementing the flow of streamed audio data between an audio I/O source (audio subsystem) 131 (e.g., the TEL system) and remote speech engines 130, as well as implementing the communication of control messages between the audio I/O source 131, controller 132 (e.g., task manager or application) and remote speech engines 130, in distributed conversational or voice processing systems as described herein. The application 132 can be local to the audio subsystem 131 or to some of the engines 130. The engines 130 can be combined in series and parallel and distributed. It is possible that the audio subsystem 131 is actually a gateway or media processing entity for a speech communication coming from a network beyond it (e.g. it could be an IVR, a wireless gateway, a VoIP gateway, etc.)

The framework of FIG. 12 assumes an application environment in which a conversational application comprises a collection of components that are dynamically associated with granularity defined by the application (persistent, per call/session, per utterance).

The basic component is the I/O channel (TEL) which comprises a control channel (e.g. D-channel in telephony) and audio channel (e.g. B-channel in telephony). The audio channel can be in an idle state, active state (D-channel active), or connected state (B-channel active). The B-channel is preferably full duplex and further split into an "audio sink" and "audio source". The speech processing components that may be attached to the audio channel include, for example, a DTMF transceiver (part of the TEL channel), an uplink signal processor (e.g., DSR optimized or DSR non-optimized codecs), a downlink signal processor (e.g., downlink codec), an ASR (e.g., server acting as an audio sink receiving a TEL source stream, optionally filtered through DSP), a TTS or prerecorded prompt player, a SIV (speaker recognizer/identifier/verifier), and a NL parser. The DTMF events may comprise, e.g., pressed key events or RFC 2833 exchanges over data channels (DTMF tones encoded as interaction events or RFC 2833 (as opposed to tone over data network). The endpoints can select the codecs via codec negotiation or advertisement and selection via SIP/SDP. Further, the codecs may be selected via settings that are established prior to the negotiations via SERCP when programming the different engines, processor and audio subsystem. When establishing the session, the endpoints negotiate as instructed. Again other processing engines can be added by simple extension, including pre/post processing acting on speech or on result of speech processing.

In the system of FIG. 12, audio I/O is performed at the audio source 131 (or media processing entity as described before). Preferably, the audio is encoded and the encoded audio is streamed as a RT-DSR RTP stream to the remote speech engines 130. The address of the engines to where the encoded audio is shipped is determined through appropriate mechanisms as described herein. SERCP provides mechanisms to remotely control the engines 130 by either the source of the audio 131 (when the audio source 131 and client application are collocated) or by the controller 132 (application or task manager) (when the application is separate from the audio source 131). An exemplary scenario in which the engines 130 are controlled by the audio source 131 is a voice-enabled cell phone application using server side speech recognition. An exemplary scenario in which SERCP is implemented for controlling the engines 130 by a third party controller (i.e. application) is a server side application that relies on speech recognition performed elsewhere in the network (e.g., the distributed telephony or conversational systems described herein).

The uplink codec (DSR or conventional) and the downlink codec (conventional) are negotiated between the audio source 131 and speech engines 130 as part of the RT-DSR call control protocols. There can be renegotiated codec changes at any time during the exchange. Preferably, barge-in and end point detection information is exchanged using the call control protocols and appropriately exploited by the source 131 and the conversational engines 130. It is to be understood that additional routers and gateways may be added as intermediaries between the different elements presented in FIG. 12 and it is possible that such an intermediary play (e.g. Media processing entity) the role of the source 131 (e.g. telephony card in a PSTN incoming call case). Various embodiments for implementing the RT-DSR streams and messages are discussed below with reference to FIG. 13.

As discussed in detail below, in a preferred embodiment, complete control of the I/O channel and speech services is achieved by control messages that define treatment of "audio in" or "audio out" (or both per message), wherein the next message is submitted only on receipt of response (which may also be an error or other asynchronous event that changes the expectation). Preferably, the speech engines and audio subsystem are defined as web services using WSDL's component oriented view of services, wherein components are defined by a set of port types comprising Sink, Source, and Context. In addition, asynchronous stop mechanism are provided to request abort of any pending action. Further, mechanism for processing streamed audio in a continuous fashion (e.g. dictating e-mail to a speech recognizer) are provided.

Speech Engine Remote Control Protocols (SERCP)

The following sections describes various methods for implementing a SERCP framework, which may be used in a distributed speech processing system according to the invention. In general, a DSR system preferably implements a SERCP that enables distribution of the conversational engines and network and system load management. SERCP is preferably implemented for multi-modal applications and other applications that require remote control of speech engines.

A preferred SERCP framework addresses the problems associated with limited client resources with respect to the conversational engine requirements, since an application can reside on the client side and drive remote conversational engines as if they were local. Furthermore, by using SERCP to drive conversational engines, the associated data files do not have to be sent to the client and can remain on the remote engines (although is to be understood a SERCP framework does not prohibit data files being transmitted to/from the client, if desired). As a result, SERCP addresses the problems associated with lack of bandwidth to send data files from the server to a local conversational engine, and server-side bandwidth requirements are reduced. Further, the latency in sending data files from the server to a local conversational engine is eliminated. Further, SERCP allows different remote engines to be used instead of using a particular engine. The owner of the data file can offer a recognition engine with data files as a web service. With respect to security, authentication can be performed with a secure intranet. WS-Security has been proposed as an appropriate framework.

Also, engine remote control may come from non-authorized sources that may request unauthorized processing (e.g. extraction of voice prints, modification of the played back text, recording of a dialog, corruption of the request, rerouting of recognition results, corrupting recognition), with significant security, privacy or IP/copyright issues. A preferred SERCP framework address these issues as Web services that are confronted to the same issues and same approaches (encryption, request authentication, content integrity check and secure architecture etc . . . ). Engine remote control may enable third party to request speech data files (e.g. grammar or vocabulary) that are considered as proprietary (e.g. hand crafted complex grammar) or that contain private information (e.g. the list of names of the customer of a bank) etc . . . . The SERCP allow to maintain control on the distribution of the speech data files needed by web services and therefore not only the authentication of SERCP exchanges but also of target speech engine web services. The exchange of encoded audio streams may raise also important security issues. However they are not different from conventional voice and VoIP exchanges.

SERCP provides a mechanism for network & system load management since any available engine can now be used.

In general, a preferred SERCP is limited to speech engine remote control. The call control functions are preferably left to the application or to a system/load manager. In other words, SERCP preferably does not provide redirection decision mechanisms or mechanisms to redirect a call. SERCP only specifies how to remotely control an engine (with the engine and the RTP stream (RT-DSR) well-identified). The SERCP framework does not have to specify the format, commands or interface that an engine can or should support. However, it is a preferred to provide a base syntax to allow some base form of interoperability (as discussed below).

In accordance with a preferred embodiment of the invention, a SERCP framework is generally based on a service-based framework that provides: (1) a set of widely supported commands and standard method for representing data; (2) a standard and extensible message format to pass parameters, specify data files, communicate/treat events and return results (the result may include the RT-DSR downlink stream such as an RTP stream of a TTS engine); (3) a standard and extensible mechanism to advertise the supported commands (e.g., OPTIONS in RTSP); and (4) a standard and extensible mechanism to advertise the interface associated to a particular command and the function that it performs.

In one preferred embodiment, SERCP is implemented using an XML-based web service. In general, a Web service is a programmable application that is accessible using standard Internet protocols. A preferred SERCP framework uses programmable application services, wherein (i) XML is used to represent data (and XML Schemas to describe data types); (ii) an extensible messaging format is based on SOAP; (iii) an extensible service description language is based on WSDL, or an extension thereof, as a mechanism to describe the commands/interface supported by a given engine; (iv) UDDI (Universal Description, Discovery, and Integration) is used to advertise the service and for consumers to locate services of interest; and wherein (v) WSFL (Web Service Flow Language) is used to provide a generic framework from combining web services through flow composition.

Preferably, WSFL is used to define the flow of the speech engines as web services and configure the overall system. Accordingly, sources, targets of web services and overall flow can be specified with WSFL. The use of web services in general and WSFL in particular, greatly simplify the remote configuration and control of chained engines that process the result of the previous engine or engines that process the same audio stream. The above framework enables speech applications to control remote speech engines using the standardized mechanism of web services. The control messages may be tuned to the controlled speech engines.

Figure 13:
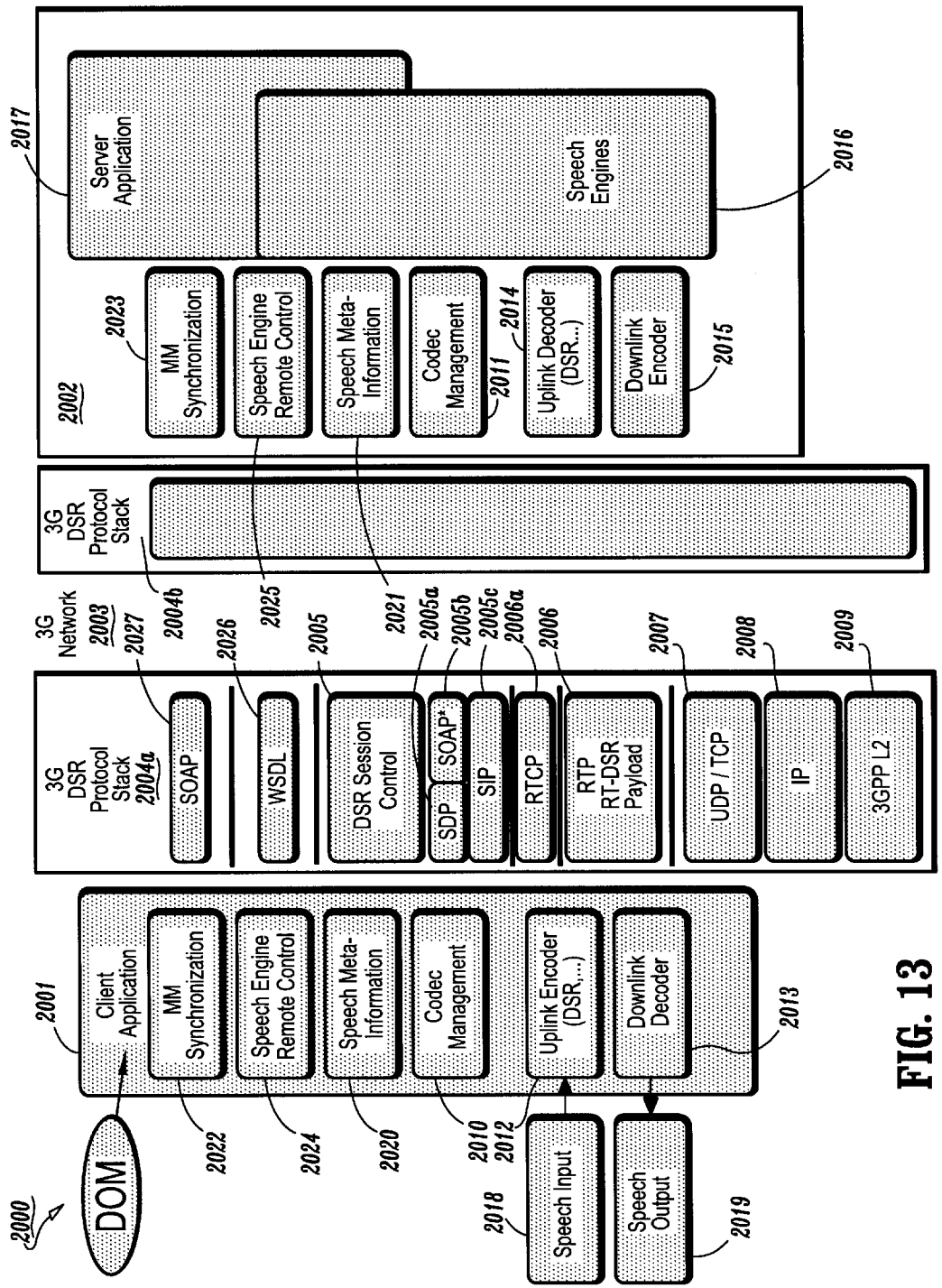
FIG. 13 is a block diagram illustrating a DSR system that may be implemented in a speech processing system according to an embodiment of the invention.

FIG. 13 illustrates how a preferred SERCP framework fits in a DSR framework that supports distribution of speech and multimodal interactions. The DSR framework, which is explained in further detail below, is depicted in the case of a 3G network. However, the DSR system can be adapted to any IP network (including on top of circuit switched) as well as to multiple networks connected through gateways.

Figure 14:
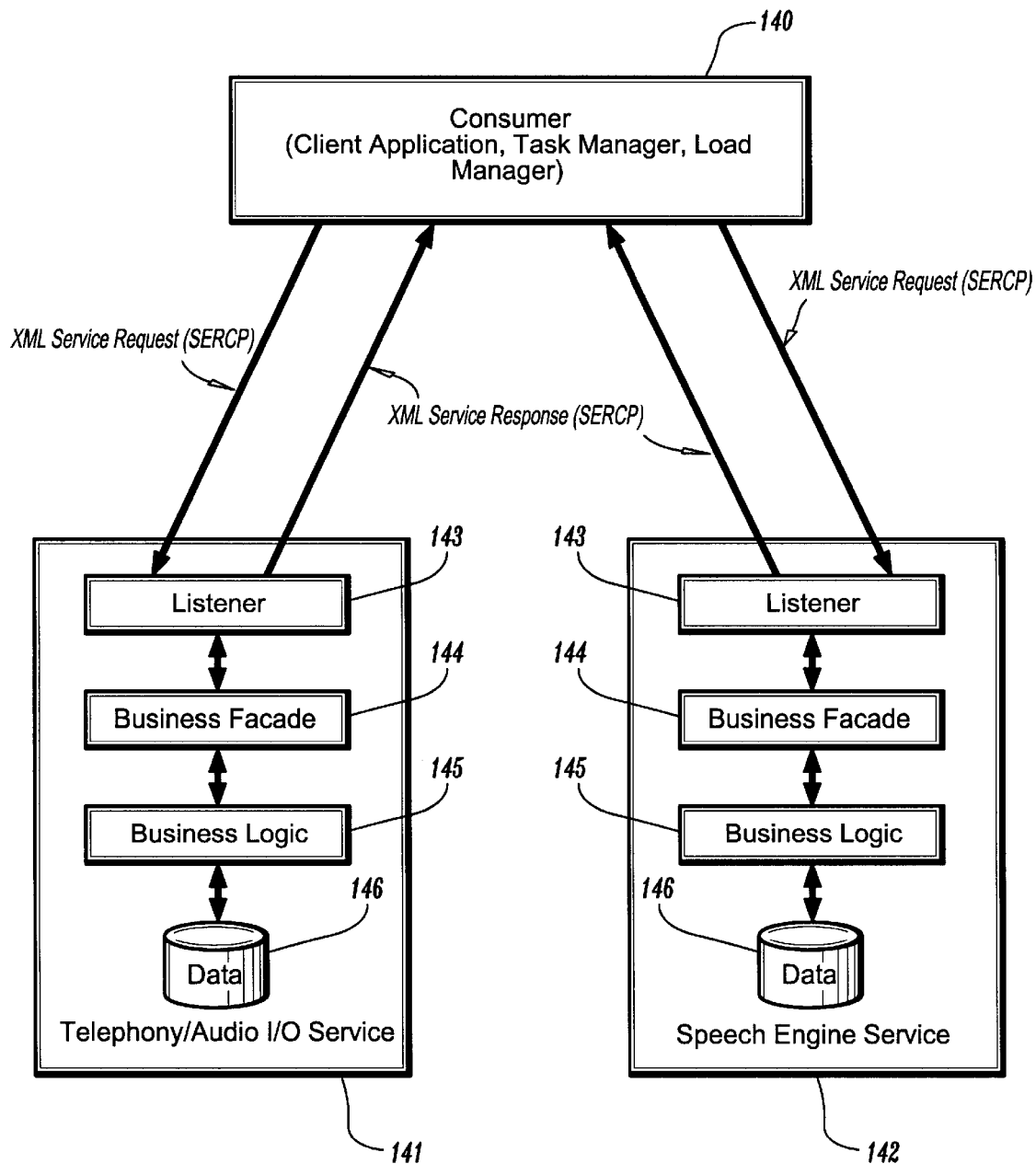
FIG. 14 is a block diagram of a web service system according to an embodiment of the invention.

FIG. 14 is a diagram illustrating a system and method for building distributed conversational systems and applications according to the invention using one or more programmable application services (e.g., web service). In one preferred embodiment, speech engines (speech recognition, speaker, recognition, speech synthesis, recorders and playback, NL parsers, and any other speech engines etc . . . ) as well as audio subsystems (audio input and output subsystems) are implemented as Web services that are described and asynchronously programmed via WSDL (on top of SOAP) (i.e. its the IDL interface of the web service can be expressed with WSDL), combined in a flow described via WSFL (Web Services Flow Language), discovered via UDDI and asynchronously controlled via SOAP. This solution presents the advantage to provide flexibility, scalability and extensibility while reusing an existing framework that fits the evolution of the web: web services and XML protocols. Web services can interact with each others by exchanging results and messages (e.g., asynchronous events) on SOAP. It is also possible to use WSXL (Web Service Experience Language) (see http://www-106.ibm.com/developerworks/webservices/library/ws-wsxl/) to have the web service coordinate their behavior at the data model, UI or controller level.

More specifically, in FIG. 14, a consumer 140 (e.g., client application, server-side application, task manger, load manager, controller, etc.) communicates via SERCP with a programmable Audio I/O service 141 and a programmable speech engine service 142. The consumer 140 may be implemented using any programming language on any platform, as long as the consumer can generate and process messages defined for the web service interface. Each programmable application service 141, 142 comprises a listener 143 that interacts with the client application 140, a business facade (interface) 141 that exposes the operations supported by associated business logic (controller) 145, and a data layer (data model) 146 that stores the data needed for providing the associated service. The business logic 145 may be implemented using conventional middleware platforms. The listener 143 receives incoming SERCP messages (e., XML-based service requests), parses the messages, and then dispatches the incoming request to the appropriate method on the business facade 144, which then uses the services provided by the business logic 145. The listener 143 further generates messages comprising responses received from the business facade 144 and sending such messages to the consumer 140.

In the system of FIG. 14, the business logic 145 for the audio I/O service 141 comprises logic for providing, e.g., control of settings of codecs, acoustic front-end processing, handling of voice activity detection, barge-in, noise subtraction, etc.) The audio subsystems are considered as "engines" that may be controlled by the application 140 using SERCP messages. Further, the business logic 145 of the speech engine service 142 comprises speech engines such as ASR, TTS, etc.

The application development environment of FIG. 14 supports various architectures for distributing the automatic speech processing from the audio subsystem and the associated controlling speech application. For instance, the speech engines can be controlled by a client application that is located on the same terminal as the source of the audio, e.g., a voice enabled client application running on a wireless terminal that uses server-side speech processing (e.g., ASR). The speech engines can be controlled by a third party controller (i.e. application, task manager, load manager). For instance, the controller may comprise a server side application (e.g. VoiceXML browser) that relies on speech recognition performed elsewhere in the network. Numerous voice portal or IVR (Interactive Voice Response) systems rely on such concepts of distribution of the speech processing resources.

Figure 17:
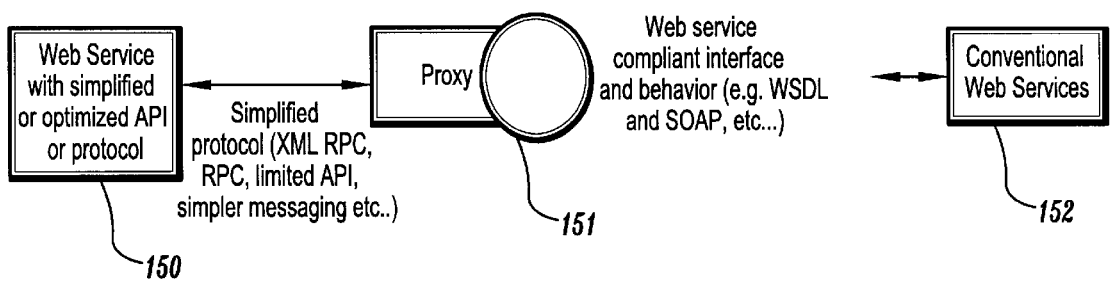
FIG. 17 is a block diagram of a web service system according to another embodiment of the invention.

In another exemplary embodiment wherein the source of the audio controls remote engines, it is possible that this be implemented on thin terminals that are not capable of running a WSDL or SOAP engine. To address this issue, SERCP proxies may be implemented to enable lightweight exchanges between the terminal and a SERCP proxy, wherein full web service capabilities exist between the SERCP proxy and the speech engines. An exemplary proxy framework is shown in FIG. 17, wherein a thin terminal 150 (having a audio I/O web service with simplified or optimized API or protocol communicates with a web service 152 (engine web service) through a proxy 151. In general, the SERCP proxy 151 implements a web service compliant interface and behavior (e.g., WSDL and SOAP, etc) that can support the translation of SERCP exchanges, for example, to add an appropriate set of internal engine contexts while hiding them to the application or terminal 150 that would issue only invariant (non-extended) SERCP calls. Also for example, the proxy 151 can issue particular call or reduce the size of the messages by using XML RPC or lighter weight messages instead of SOAP messages In addition, the SERCP proxy 151 can handle engine allocation or engine requests to resource allocation services.

In a preferred embodiment, the framework of web services is considered an efficient, extensible and scalable way to implement SERCP that enables standards-based communication between programs written in different languages on different platforms. WSDL is a preferred method for describing the different interfaces of the web service so that an application developer can design an application to access the web service. WSDL defines the services as collections of network endpoints or ports, wherein each port is defined by associating a network address with a reusable biding, and wherein a collection of ports define a service. WSDL provides abstract definition of endpoints and messages which is separate form the network deployment or data format binding. Abstract definitions of messages comprising abstract descriptions of the data being exchanges and port types.

According to the proposed framework, speech engines are defined as web services that are characterized by an interface that consists of some of the following ports: (1) "control in" port(s): sets the engine context, i.e. all the settings required for a speech engine to run. It may include address where to get or send the streamed audio or results; (2) "control out" port(s): produces the non-audio engine output (i.e. results and events). It may also involve some session control exchanges; (3) "audio in" port(s): Streamed input data; and (4) "audio out" port(s): Streamed output data.

Similarly, audio subsystems, can also be treated as web services that can produce streamed data or play incoming streamed data as specified by the control parameters. It is possible that the "control in" or "control out" messages are in practice sent or received interleaved with "audio in or out" data. This can be determined in the context (setup) of the web services. Speech engines and audio subsystems are preprogrammed as web services and composed into more advanced services. Once programmed by the application/controller, audio-sub-systems and engines await an incoming event (established audio session, etc . . . ) to execute the speech processing that they have been programmed to do and send the result as programmed. It is to be understood and appreciated that any other speech processing engines (e.g. speech detection, barge-in detection etc) that process audio input or output or the results of such processing can also be implemented as web services in accordance with the present invention.

The speech engines web service 142 is preferably programmed to completely handle a particular speech processing task, including handling of possible errors. For example, as speech engine is programmed to perform recognition of the next incoming utterance with a particular grammar, to send result to a NL parser and to contact a particular error recovery process if particular errors occur. Otherwise, numerous additional exchanges must take place between the web service and the application to handle the exception or error that may have take place etc. This increases delays and traffic. However, the web service framework would also support such a less efficient approach.

The following list of services and control types is not exhaustive. It is provide purely as illustration. These examples assume that all control messages are sent as "control in" and "control out". As explained above, the framework could support such exchanges implemented by interleaving with the streamed audio, etc. The following are examples of control messages for SERCP web services:

(1) Audio input Subsystem—Uplink Signal processing: (i) control in: silence detection/barge-in configuration, codec context (i.e. setup parameters), asynchronous stop (ii) control out: indication of begin and end of speech, barge-in, client events; (iii) audio in: bound to platform (e.g., from TEL source); and (iv) audio out: encoded audio to be streamed to remote speech engines;

(2) Audio output Subsystems—Downlink Signal processing (downlink decoder): (i) control in: codec/play context, barge-in configuration (stop playback), play, etc.; (ii) control out: done playing, barge-in events; (iii) audio in: from speech engines (e.g. TTS); and (iv) audio out: to platform (e.g., to TEL sink);

(3) Speech recognizer (ASR) (server acting as audio sink (receiving TEL source stream, optionally filtered via DSP)): (i) control in: recognition context, asynchronous stop; (ii) control out: recognition result, barge-in events; (iii) audio in: from input subsystem (TEL) source; and (iv) audio out: none;

(4) Speech synthesizer (TTS) or prerecorded prompt player: (i) control in: annotated text to synthesize, asynchronous stop; (ii) control out: position of markers; status (what has been synthesized so far); (iii) audio in: none; and (iv) audio out: audio streamed to audio output subsystem (TEL sink) or other processor;

(5) Speaker recognizer (identifier/verifier): (i) control in: claimed user id (for verification) and context; (ii) control out: identification/verification result, enrollment data; (iii) audio in: from audio input subsystem (TEL), optionally filtered through downlink DSP; (iv) audio out: none;

(6) DTMF Transceiver (part of TEL): (i) control in: how to process (DTMF grammar), expected output format, etc.; (ii) control out: appropriately encoded DTMF key or string (e.g. RFC 2833); (iii) audio in: bound to platform events (possibly programmed by control-in); and (iv) audio out: none; and (7) Natural language parser: (i) control in: combined recognition and DTMF detector results; (ii) control out: natural language results; (iii) audio in: none; and (iv) audio out: none It is to be understood that variations and additional examples of speech engines as web service examples can be considered (e.g., pre/post processing can also be considered as other web services).

The use of web services enables pre-allocating and pre-programming the speech engines. This way, the web services framework automatically handles the racing conditions issues that may otherwise occur, especially between the streamed audio and setting up the engines. This is especially critical when engines are remote controlled across wireless networks where control and stream transport layer may be treated in significantly different manners.

The web service approach also allows the handling of the streamed audio to be decoupled from control and application level exchanges. This simplifies deployment and increases scalability. By using the same framework as web services, it is possible to rely on the numerous tools and services that have been developed to support authoring, deployment, debugging and management (load balancing, routing etc . . . ) of web services. With such a web service view, the specification of SERCP can directly reuse of protocols like SOAP, WSDL, WSFL and UDDI. Contexts can be queried via WSDL or advertised via UDDI. Using WSDL, it is possible to asynchronously program each speech engine and audio subsystems.

To illustrate a preferred embodiment of SERCP, let us consider the case where speech engines are allocated via an external routing/load balancing mechanism. A particular engine can be allocated to a particular terminal, telephony port and task on an utterance or session basis. Upon allocation, the application sets the context via WSDL. This includes the addresses of the source or target control and audio ports.

As an example, consider a speech recognition engine allocated to a particular application and telephony port. WSDL instructions program the web service to recognize any incoming audio stream from that telephony port address with a particular grammar, what to do in case of error (what event to throw where), how to notify of barge-in detection, what to do upon completion of the recognition (where to send result and end of recognition events). Similarly the telephony port is programmed via WSDL to stream incoming audio to the audio port of the allocated ASR web service. When the user speaks, audio is streamed by the port to the ASR engine that performs the pre-programmed recognition task and sends recognition results to the preprogrammed port for example of the application (e.g. VoiceXML browser). The VoiceXML browser generates a particular prompts and programs its allocated TTS engine to start generating audio and stream it to the telephony port. The cycle can continue.

WSFL provides a generic framework from combining web services through flow composition. Preferably, WSFL is implemented to define the flow of the speech engines as web services. Accordingly, sources, targets of web services and overall flow can be specified with WSFL. The use of web services in general and WSFL particular greatly simplifies the remote configuration and remote control of chained engines that process the result of the previous engine or engines that process the same audio stream.

While it may be possible to support such usage without supporting the configuration and control of parallel or serial (or more complex) combinations of engines, such deployments configurations would then require numerous round trips between the application and the different engines. The resulting hub-centric architecture may not be the most efficient way to proceed.

UDDI is a possible way to enable discovery of speech engines. Other web services discovery and advertisement approaches can be considered. Speech engines advertise their capability (context) and availability. Applications or resource allocation servers interrogate to UDDI repository to discover available engines that can be allocated for the next utterance or session.

As noted above, a preferred embodiment for SERCP uses SOAP to transport WSDL and WSFL. It is also particularly attractive as events and other messages between controllers and web services as well as among speech engine/audio subsystems web services can also be transported via SOAP. Exchanges of results and events (including, stop, resume reset etc . . . ) among speech engine and audio subsystem web services and between web services and the controller or application, can be done via SOAP.

More advanced coordination mechanisms can be used for example following frameworks as proposed in WSXL. SOAP presents the advantage that SOAP: is a distributed protocol that is independent of the platform or language; is a lightweight protocol, requiring a minimal amount of overhead; runs over HTTP (allowing access through firewalls); can run over multiple transport protocols such as HTTP, SMTP, and FTP (which simplifies its transport through wireless networks and gateways); is based on XML which is a highly recognized language used within the Web community; SOAP/XML is gaining increasing popularity in B2B transactions and other non-telephony applications; SOAP/XML is appealing to the Web and IT development community due to the fact that is a current technology that they are familiar with; and SOAP can carry XML documents. SOAP over SIP or RTP is also an option.

At the same time, this may require exploring additional transport protocols for SOAP to facilitate it support by particular network (e.g. 3G as specified by 3GPP). This may include SOAP over SIP, RTP etc . . . . Syntax and semantics can be specified in numerous ways to describe for the speech engine and audio subsystem context and additional SOAP events and control messages.

The SERCP syntax and semantics are preferably extensible to satisfy "target-2" (as described below). As such it should be XML-based with clear extensibility guidelines. This web service framework is inherently extensible and enables the introduction of additional parameters and capabilities. The SERCP syntax and semantics are preferably designed to support the widest possible interoperability between engines by relying on invariant messages across engine changes as discussed earlier. This should enable to minimize the need for extensions in as many situations as possible. Existing speech API can be considered as good starting points.

To that effect, it is preferred that speech engines as web services be considered to come with internal contexts that typically consists of the context beyond the scope of the invariant-based SERCP syntax and semantics. In as much as possible, the semantics and syntax should rely on the W3C Voice Activity specifications to describe the different speech data files required by the engines. Speech engine and audio subsystem syntax and semantics have numerous solutions covered by the teachings of the present invention.

It is to be understood that an XML Web services framework or implementing SERCP as discussed above is one preferred embodiment for implementing SERCP. Other frameworks for SERCP may be considered based on the following considerations and preferred requirements. For example, SERCP may be implemented via RTSP (Real Time Streaming Protocol) or an extension thereof, which is already designed as a remote control protocol (see, e.g., RFC 2326, which is incorporated herein by reference). SERCP may be implemented via WSDL (web services description language), or an extension thereof, or any suitable mechanism to describe the commands/interface supported by a given engine. Preferably, SERCP supports VoiceXML 1.0 and 2.0 (and its extensions) and functionality, which requires some extensions to VoiceXML to specify: remote engines to use and data files to use. Preferably, the parameters and results are compatible with the W3C Voice specifications when appropriate. This should include support for arbitrary parameters and input (possibly based on Xschema). To implement remote control commands, SOAP over RTSP can be used.

It is to be understood that any suitable protocol can be used to implement SERCP as a remote speech API (TCP, Sockets, RMI, RPC, SOAP, on TCP, UDP, HTTP, SIP, RTP, RTSP etc . . . ). This requires a particular semantics and syntax for the implementation of the speech engine remote control. Preferably, any Speech API syntax can be implemented on top of RTSP, SIP, HTTP, RTP or TCP or using SOAP/WSDL on top of the same set of protocols.

There are numerous challenges to the specification of an appropriate SERCP framework. Numerous proprietary or standardized fixed engine APIs have been proposed (e.g. SRAPI, SVAPI, SAPI, JSAPI, etc . . . ). None have been significantly adopted so far. Besides strong assumptions in terms of the underlying platform, such APIs typically provide too poor functions. Only very limited common denominator engine operations are defined. In particular, it is often difficult to manipulate results and intermediate results (usually exchanged with proprietary formats). On the other hand, it would have been more practical to add more capabilities to these APIs. Preferably, a SERCP framework according to the present invention is preferably not designed as a fixed speech engine API, but is designed as a rich, flexible and extensible framework that allows the use of numerous engines with numerous levels of capabilities.

The considerations made above raise fundamental issues in terms of standardization and interoperability. SERCP is preferably able (target-1) to replace a speech engine provided by one speech vendors by an engine provided by another and still be able to run immediately the same speech application without any other change. and (target-2) enables speech applications to control remote speech engines using a standardized mechanism but messages tuned to the controlled speech engines.

Target-1 is very difficult to achieve. Today, speech engine settings are adapted to particular tasks. Speech data files (acoustic models, engine configurations and settings, front-end features, internal algorithms, grammars, etc . . . ) differ significantly from vendor to vendor. Even for a same vendor, the deployment of performing conversational applications require numerous engine settings and data file tuning from task to task. In addition, conversational applications and engines still constitute an emerging field, where numerous changes of behavior, interfaces and capabilities must be supported to enable rapid introduction of new conversational capabilities (e.g. support of free flow dialogs, NL parsing etc . . . ).

Eventually, in most common usage scenarios where SERCP would be used by a terminal to drive remote engines or by a voice portal to perform efficient and scalable load balancing, the application/controller knows exactly the engine that it needs to control and the value is to rely on a standardized way to implement this remote control. It may be possible to define a framework where a same application can directly drive engines from different vendors. Such usage scenarios are particular cases of the (target-2) framework. (target-1) would introduce unnecessary usage limitations.

Wireless deployments like 3GPP will require end-to-end specification of such a standard framework. At this stage, it is more valuable to start with an extensible framework (target-2) and when appropriate, provide a framework that addresses (target-1). Therefore, it is preferred that a SERCP framework focuses on (target-2), while providing mechanisms to achieve (target-1) when it makes sense. The (target-2) will not impact in anyway the functions that can be supported today and in the future.

Based on the above, the following key requirements for SERCP (independently of what is the implementation technique used) in accordance with the present invention are: (i) SERCP must provide a standard framework for an application to remotely control speech engines and audio subsystems, and the associated SERCP messages may be tuned to the particular speech engine; (ii) SERCP must not aim at supporting application interoperability across different speech engines with no changes of the SERCP messages; and (iii) SERCP should aim at distinguishing and defining messages that are invariant across engine changes from messages that are engine specific.

As a result, adding support of speech engines from another vendor may require changes of the SERCP messages and therefore changes of the application or dialog manager to support these new messages. In the web service framework described above, this results in changing the WSDL (XML) instructions exchanged with the engines. However, it does not imply any changes other than adaptation of the XML files exchanged with the engines.

In accordance with the present invention, SERCP is preferably based on the following framework: (i) SERCP preferably reuses existing protocols; (ii) SERCP maintains integrity of existing protocols; and (iii) SERCP preferably avoids duplication of existing protocols.

In the context of the DSR framework (FIG. 13), the following requirements have been considered. As noted above, a DSR framework according to the present invention is not limited to the use of DSR optimized codecs, but it can be used in general to distribute speech recognition functions with any encoding scheme. Preferably, SERCP controls the different speech engines involved to carry a dialog with the user. As such, SERCP should not distinguish between controlling a single engine or several engines responsible to process speech input and generate speech or audio output.

Further, SERCP should not specify call-control and session control (redirection etc . . . ) and other platform/network specific functions based on dialog, load balancing or resource considerations. However SERCP preferably supports the request to expect or establish streaming sessions between target addresses of speech engines and audio-subsystems. Session establishment and control MUST rely on existing protocols.

Further, SERCP must not address the transport of audio. SERCP may address the exchange of result messages between speech engines. SERCP preferably supports the combination of different engines that will process the incoming audio stream or post-process recognition results. For example, it should be possible to specify an ASR system able to provide an N-Best list followed by another engine able to complete the recognition via detailed match or to pass raw recognition results to a NL parser that will tag them before passing the results to the application dialog manager.

In addition, SERCP preferably enables engines to advertise their capabilities, their state or the state of their local system. This is especially important when the framework is used for resource management purpose.

Moreover, SERCP should not constrain the format, commands or interface that an engine can or should support. SERCP is preferably vendor neutral: SERCP preferably supports any engine technology and capability, any type of engine functionality (existing and future), as well as vendor specific commands, results and engine combination through a well specified extensible framework.

Furthermore, SERCP is preferably asynchronous. SERCP is preferably able to stop, suspend, resume and reset the engines. SERCP is preferably not subject to racing conditions. This requirement is extremely important. It is often difficult from a specification or a deployment point of view to efficiently handle the racing conditions that may occur when hand holding the engine to load appropriate speech data files (e.g. grammars, language model, acoustic models etc . . . ) and report/handle error conditions while simultaneous racing with the incoming audio stream. It is also important to consider, when developing the SERCP framework, issues of: scalability and robustness of the solution, simplicity of deployment, and transmission across firewalls, gateways and wireless networks. This implies that the end-to-end specification of SERCP and the assumed protocols that it may use for transport must be supported by the target deployment infrastructure. This is especially important for 3G deployments.

Other issues to consider are the need to support the exchange of additional meta-information useful to the application or the speech engines (e.g., speech activity (speech-no-speech)), barge-in messages, end of utterance, possible DTMF exchanges, front-end setting and noise compensation parameters, client messages (e.g., settings of audio-subsystem, client events, externally acquired parameters), annotations (e.g. partial results), application specific messages). A DSR framework as described in FIG. 13 according to the invention transmits some of the speech meta-information as part of the audio transport or the audio session control (e.g. SIP) exchanges.

Although a RTSP-based framework (or similar variations carried on other protocols like SIP, HTTP or TCP) is also taught by this invention, however, it does not satisfy the requirements above, it may be used in other embodiments. RTSP is essentially a fixed speech engine API designed to be remotely used. RTSP aims at satisfying (target-1) instead of (target-2). RTSP does not handle efficiently extensibility, beyond a standardized syntax (speech invariant messages). RTSP only allows to pass proprietary parameters in a non-standardized manner. RTSP may be subject to racing conditions when used to control the speech engines with an application that is not collocated with the audio-subsystems. RTSP does not address combination of different engines (e.g. speech engine followed by NL parser; exchange of partial results, parallel use of speaker recognition and speech recognition engine, etc . . . ). The underlying transport protocols may be problematic in 3G deployments: RTSP may not be supported by 3GPP and SIP may not handles as well the racing conditions. RTSP is confusing in the way that it relies and extends RTSP.

As noted above, a preferred SERCP framework relies on a complete web service framework based on SOAP and WSDL, and the advantages thereof have been described above. A SERCP based on the web service framework satisfies all the considerations and preferred requirements enumerated above. However, other frameworks for providing speech engine services outside a SOAP-based web service framework can be implemented based on the teachings herein. For example, it may be possible that a RTSP-derived type of protocol can be used to asynchronously program and control such web services.

In summary, a preferred SERCP framework according to the invention employs a WSDL/SOAP/WSFL/JUDDI framework to program and control remote engine. In addition, the SERCP syntax and semantics engine invariants are preferably based on RTSP-derived protocols.

SERCP may raise several security issues that can be addressed by appropriate authentication, integrity control and other conventional security approaches. Engine remote control may come from non-authorized sources that may request unauthorized processing (e.g. extraction of voice prints, modification of the played back text, recording of a dialog, corruption of the request, rerouting of recognition results, corrupting recognition), with significant security, privacy or IP/copyright issues. SERCP follows the same practices as Web services that are also confronted to the same issues and same approaches (encryption, request authentication, content integrity check and secure architecture etc . . . ) can be used with SERCP. Further, engine remote control may enable third party to request speech data files (e.g. grammar or vocabulary) that are considered as proprietary (e.g. hand crafted complex grammar) or that contain private information (e.g. the list of names of the customer of a bank), etc. A SERCP framework preferably addresses how to maintain the control on the distribution of the speech data files needed by web services and therefore not only the authentication of SERCP exchanges but also of target speech engine web services. The exchange of encoded audio streams may raise also important security issues that may require encryption, integrity protection or trust management.

Based on the above, in one embodiment, SERCP is based on SOAP messages. However, SOAP 1.1 does not properly address the issue of embedding literal XML chunks into value fields, which is needed to efficiently pass (i) marked/annotated text to be synthesized or (ii) declarative grammar descriptions. It is possible to circumvent this limitation by using: (i) MIME types to embedded binaries or XML literal portions; (ii) URI to point to documents that contain the XML literals or binaries; (iii) Microsoft implementation extensions; or (iv) using WSDL 1.1 specification, which is fixed with later versions of SOAP and web services XML protocols.

Preferably, SERCP is defined using WSDL, with the transport protocol comprising HTTP 1.1. (maintaining the connection across multiple requests is important). Extensions to other transport/session protocols may be defined.

The speech engines typically require fairly complex context. There are some standards available in this area, although the set is far from complete and commonly available. Some existing standards per engine types are as follows. For TTS, the W3C Speech Synthesis Markup Language Specification and SABLE may be used. The latter is satisfactory in its current form. Indeed, the W3C draft misses markers. This is an important component needed to implement some form of dialogues, e.g. speech response "this one" to a prompt enumerating choices can be interpreted properly only if we know the position in the audio out stream based on markers. SABLE also addresses vendor specific extensions to the annotation.

For ASR, the context of recognition is coarsely defined as pronunciation lexicon(s), grammar(s) and language model. There are W3C specification defining grammars (i.e., the Speech Recognition Grammar Specification for the W3C Speech Interface Framework) and language models (i.e., The W3C Stochastic Language Models (N-Gram) Specification).

For speaker identification/verification, the known SVAPI (speaker verification and Identification API) may be used. The SVAPI discuss engine control and passage of engine context with a formalism that could easily be serialized and adapted to the present framework.

For NL parser, the W3C specification for Natural Language Semantics Markup Language for the Speech Interface Framework, formalizes the output of the parser. It does not address the parser control and context settings. However, it addresses the parser output.

In addition, Telephony and other audio I/O platforms have numerous standard specifications. We will leave most of these features to the telephony or I/O platform.

On the basis of these numerous specification, the following set of non-exhaustive messages are preferred as a set of requests for implementing SERCP. The following exemplary list of messages comprises a non-exhaustive lis of messages that can be exchanged between the controller and the remote conversational engines.

TEL: The TEL component is assumed to be a telephony platform or a gateway—I/O platform capable of receiving the HTTP/SOAP requests and access to control of the telephony facilities.

A distinction is made between TN (telephone number) and digits (in-band DTMF). The TN applies to the call control and may be mapped into either DTMF (analog and T1/E1 CAS signaling) or content of D-channel message (PRI and H.323). For analog and CAS channels, the specification of the TN string can be extended with extra characters marking pause, flash, wait for tone indicator, etc. The second is just an audio signal detached from the call control and can be specified only as digits (i.e. 0 . . . 9*#A . . . D). Some sample messages are as follows:

```
callControl--audjo path not established
    <SOAP-ENV:Envelope
        xmlns:SOAP-ENV="http://schemas.xmlsoap.org/soap/envelope/"
        SOAP-ENV:encodingStyle="http://schemas.xmlsoap.org/soap/encoding/"/
    >
            <SOAP-ENV:Body>
                <tel:CallControl xmlns:tel="telURI">
                    <Action>MakeCall</Action>
                    <CalledTn>5555555555</CalledTn>
                    <CallingTn>5555555555<CallingTn>
                    <UUI>user-to-user information</UUI>
                </tel:CallControl>
            </SOAP-ENV:Body>
    </SOAP-ENV:Envelope>
    <element name="CalledTn" type="SOAP-ENC:string"/>
    <element name="CallingTn" type="SOAP-ENC:string"/>
    <element name="UUI" type="SOAP-ENC:string"/>
    <element name="Action" type="tns:Action"/>
    <simpleTYPE name="action" base="xsd:string"/>
        <enumeration value="WaitForCall "/>
        <enumeration value="WaitForHangup "/>
        <enumeration value="AnswerCall "/>
        <enumeration value="MakeCall "/>
        <enumeration value="DropCall "/>
        <enumeration value="RejectCall "/>
        <enumeration value="ReleaseCall "/>
        <enumeration value="HoldCall "/>
        <enumeration value="RetrieveCall"/>
        <enumeration value="AcceptCall"/>
        <enumeration value="TransferCall"/>
        <enumeration value="BlockCalls "/>
        <enumeration value="UnblockCalls "/>
    </simple/Type>
AudioControl--audio path established
    <tel:AudiControl>
        <Action>PlayRecord</Action>
        <Sink>localhost:2000</Sink>
        <CollectDigitsCount>7</CollectDigitsCount>
        <FirstDigitTimeout>4000</First DigitTimeout>
        <NextDigittimeout>2000</NextDigitTimeout>
        <TerminatingDigits>"#*"</TerminatingDigits>
        <StopOnDigit>1</StopOnDigit>
    </tel:AudiControl>
    <element name="Sink" type="SOAP-ENC :string"/>
    <element name="DigitsToSend" type="int"/>
    <element name="CollectDigitsCount" type="int"/>
    <element name="FirstDigitTimeout" type="int"/>
    <element name="NextDigitTimeout" type="int"/>
    <element name="TerminatingDigits" type="SOAP-ENC:string"/>
    <element name="Action" type="tns:Action"/>
    <simpleType name="Action" base="xsd:string"/>
        <enumeration value ="Play"/>
        <enumeration value ="Record"/>
```

```
<enumeration value ="PlayRecord"/>
<enumeration value ="SendDigits"/>
<enumeration value ="CollectDigits"/>
</simpleType>
```

The reason to call control messsages indicate status:

Done,

Error (recoverable, channel is still usable) or

Failure (channel needs to be taken out of service and/or recycled).

Details are provided in a reason field (values depend on the request type, e.g. for PlaceCall it could be Busy, NoAnswer, FaxTone, SIT (SpecialInformationTone), NoDialTone,etc.).

The responses to audioControl messages indicate status:

Done,

Error,

Failure, and in addition Hangup, Dtmf.

If play and/or record are part of the request, number of bytes played/recorded, number of overruns/underruns, completion reason (timeout, silence, digits, etc.), play/record start/stop time stamp (sss.ms) are included in the response.

If digits collection is requested, the status (Done, Timeout, Terminating Digit) and collected digits are included in the response.

ASR: The context components defined for ASR include lexicon, grammar and language model. This list can be extended to the following:

pronunciation lexicon—defined as a list of two (optionally three) fields: <spelling><pronunciation> [soundslike]

vocabulary—defined as a list of entries (constructed using spellings), equivalent to flat grammar grammer—as per W3C or vendor specific language model—vendor specific, possibly supplied with left and right context (e.g. for correction of dictation)

acoustic add word—arbitrarily assigned spelling

Each context is defined by type, name (reference) and content. The name should be used in future references to this context (e.g. adding words to a vocabulary). The action is optional (the default action is always load if not loaded and enable, disable at the end of utterance, unload if ttl attribute dictates so).

The context attributes are:

ttl—time-to-live defined as utterance, session, persistent embed—bool, applied to vocabulary (1 indicates that it's embedded in a grammar) or grammar (embedded into another grammar or language model)

weight—0 . . . 100, relative weight of the context

Sample message include:

ASR--reeognition
```
<asr:RecognitionControl>
    <Action>Reeognize</Action>
    <ServerType>reco</ServerType>
    <NBest>3</NBest>
    <asr:ContextArray SOAP-ENC:arrayType ="asr:Context[4]"/>
        <Context ttl ="session" weight ="50"/>
```

```
            <type>grammar</type>
            <name>yesno</name>
            <content>http://foo/yesno.bnf</content>
        </Context>
        <Context weight ="75">
            <type>vocabulary</type>
            <name>states</name>
            <content>Alabama Alaska "New York"</content>
        </Context>
        <Context>
            <type>addToVocabulary</type>
            <name>names</name>
            <content>="John Doe"</content>
        </Context>
        <Context ttl ="utterance">
            <type>pronunciations</type>
            <name>yes</name>
            <content>YES "Y EX S" ""</content>
        </Context>
    </asr:ContextArray>
</asr:RecognitionControl}
<element name ="Action" type ="tns:Action"/>
<simpleType name ="Action" base/>="xsd:string">
    <enumeration value ="Recognize"/>
    <enumeration value ="AddWord"/>
</simpleType>
```

The response to ASR request should contain up to Nbest results, each result consisting of the recognized text, its translation (according to the grammar rules), score, list of words with each word annotated with relative start time, end time, score and name of the context used to obtain the result.

For dynamically allocated servers (e.g. a new server allocated per utterance) the response may contain server's opaque data to be passed to the next allocated server.

SVI: Sample Message

Speaker Verification/Identification:

```
<siv:SpeakerIdControl>
    <Action>Verify</Action>
    <ServerType>siv</ServerType>
    <UserId>user</UserId>
    <Context>
        http://foo/verificationData
    </Context>
}
<element name="Action" type="tns:Action"/>
<simpleType name ="Action" base="xsd:string">
    <enumeration value ="Enroll"/>
    <enumeration value ="Identify"/>
    <enumeration value ="Verify"/>
</simpleType>
TTS:
<tts:SynthesisControl>
    <ServerType>tts</ServerType>
    <Sink>localhost:2222</Sink>
    <Text>...</Text>
<tts:SynthesisControl>
```

In this example, the text to be synthesized here is a literal XML chunk annotated using SABLE. It may also contain references to prerecorded audio segments, placing it into SOAP messages uses the "literal" attribute.

Distributed Context

Context stored in database can be retrieved by the controller and passed by value to remote engine or pass by URI to the engines that are then responsible for retrieving it themselves.

Additional specifications are preferred for: (i) protocol for engines to register their availability; (ii) protocols for engines to describe their capabilities; (iii) protocol for engines to describe their current status; (iv) protocol for engines to describe the state of their local system (server).

These protocols can be defined within the framework of XML protocols.

A more detailed discussion of preferred conversational protocols that are used in a distributed telephony system according to the invention will now be discussed with reference to the DSR system of FIG. 13, which provides support for SERCP and multi-modal synchronization as discussed, for example, in the above-incorporated U.S. Ser. No. 10/007,092. The system 2000 of FIG. 13 provides a multi-modal DSR protocol stack. The DSR system 2000 and associated stack of protocols are implemented to distribute speech engines and applications between a terminal audio subsystem and a server. The system of FIG. 13 comprises a 3G profile of the framework built on IMS (Internet multimedia streaming)/SIP/SDP and RTP, or H.323 oriented (which is another framework for DSR aimed more at VoIP deployment over wired networks).

The system 2002 comprises a client 2001 and server 2002 that communicate over a network 2003 (e.g. a 3G wireless network) via compatible DSR protocol stacks 2004a, 2004b. A DSR protocol stack comprises a SOAP layer 2027, a WSDL layer 2026, a DSR session control layer 2005 (which preferably implements SDP (Session Description Protocol) 2005a, SOAP* 2005b (a statically defined version of the SOAP standard which does not require a SOAP engine) and SIP (Session Initiation Protocol) 2005c), a RTCP control layer 2006a for controlling transport of data that is packetized via a DSR transport protocol/payload layer 2006, a transport layer 2007 (e.g., UDP or TCP), a network layer 2008 (e.g., IP) and a data link/physical layer 2009 (e.g., based on 3GPP (Third-generation Partnership Protocol) L2 layer). It is to be understood that the server SDR protocol stack 2004b comprises the same architecture of the client DSR protocol stack 2004a. The various functions provided by the components of the DSR protocol stack will be discussed in detail below. It is to be understood that the DSR system of FIG. 13 is specific to 3G networks, and that those of ordinary skill in the art can readily adapt the DSR framework to any other IP network infrastructure as well as to architectures where different networks interoperate through intermediate gateways.

The client 2001 (which is preferably a DOM-based client) comprises a codec manager 2010 for managing a plurality of uplink speech encoders 2012 that encode speech input 2018 (and other audio input) and for managing a plurality of downlink decoders 2013 that decode results generated by engines 2016 and returned to the client 2001. The server 2002 comprises a codec manager 2011 for managing a plurality of uplink speech decoders 2014 that decode the encoded speech (or audio) received from client 2001 for server-side processing via engines 2016. The codec manager 2011 also manages a plurality of downlink encoders 2015 that encode the speech (audio) processing results returned from engines 2016 for transmission to the client 20s01. The codec managers 2010 and 2011 select appropriate codecs that are negotiated at the initiation of a session and that may be dynamically switched during a session. Preferably, the DSR system supports one or more DSR optimized codecs for the uplink codec and one or more DSR non-optimized codecs for the uplink and downlink codecs. A DSR optimized codec is one that used a compression scheme that minimizes the distortion of the acoustic features so as to provide intelligible reconstruction of the voice data. This can be contrasted with DSR non-optimized codecs which use compression schemes designed with other cost functions to minimize, for a given bit rate, some perceptual impact of distortions of the waveform or the spectrum, with no regard for the impact of the compression on the acoustic features (e.g. AMR, G711, G723, etc.)

Preferably, a unique nomenclature is defined to support one more key default DSR optimized codec schemes for the uplink codec (including front-end processing and compression) such as IBM's RecoVC and/or a codec based on the ETSI Standard ES 201108 front-end. Within the "Aurora" DSR working group of the European Telecommunications Standards Institute (ETSI), a payload is defined as a standard (February 2000 [ES201108] to provide interoperability with different client devices and speech engines, which standard can be selected as the default DSR optimized codec to be supported by all DSR participants. A conventional non DSR optimized codec could also be selected (e.g. AMR narrow band or AMR wide band (=G.722.2)).

In further embodiments of the invention, other codecs are supported to provide Advanced FE, tonal support, reconstruction support, support of tonal languages other sampling frequencies, AMR and other conventional codecs, and proprietary DSR optimized codecs. Preferably the nomenclature is compatible with H.245 tables of H.323 or SIP codecs (conventional/perceptual coders) (SDP syntax). An example of nomenclature can be for SIP/SDP: nNaming codecs with a namespace convention. A proposed syntax that fits current SDP practices is: {vendor or standard body identifier}/codec name/sampling frequency (in Hz)/(R|N), where R is for reconstruction support and N is for no reconstruction. By default, the default is N. A particular case of reconstruction is RecoVC, as disclosed in the above incorporated U.S. Ser. No. 10/104,925, for example.

Example of the codec naming are: (i) Aurora/DSR/8000 or the equivalent notation Aurora/DSR/8000/N for the ETSI Standard ES 201 108 for DSR (it could also be designated as ETSI/ES201108/8000/N); and (ii) com.ibm/RecoVC/16000/R for IBM RecoVC.

For default downlink codecs, any suitable codec scheme such as GSM (FR, HR, EFR or AMR xx) and/or G.723.1, may be implemented by a DSR framework. Currently, GSM FR and AMR is available on mobile phones and, consequently, would be a natural choice. But mobile phones are not the only devices that can support a DSR framework work. Preferably, a default DSR scheme and a default codec are support by default (using the H.323 approach, for example, or preferably the SIP/SDP session initiation). This aims at minimizing incompatible connections and also address the concerns of handset and other embedded clients that can only support one DSR compression scheme.

Preferably, a mechanism is employed to immediately identify if an end-point supports the default codec and scheme or not. Further, a mechanism is preferably employed to describe arbitrary (i.e. non default and non-parameterized) DSR schemes (e.g. XPath namespace conventions) (see the proposed naming convention above).

Preferably, a variety of different codecs (other than the default DSR codec) are supported for the uplink and the default downlink codecs. This guarantees that the DSR protocol framework is generic enough to be compatible with DSR clients (e. g. 3G clients), VoIP gateways and IVRs. In addition, this enables the use of codecs specialized for particular algorithms (e. g. speaker recognition, robust features (Aurora WI-8), with or without reconstruction capabilities and tonal language support (Aurora WI-30)) or particular tasks.

In one embodiment, codec identification comprises the following format: DSR/{vendor or standard body identifier}/codec name/sampling frequency (in Hz)/(R|N) wherein, R denoted reconstruction support and N denotes no reconstruction support.

In addition, a DSR framework according to the present invention preferably supports dynamic switching between available codecs. There are various situations in which codecs may be switched during a session. For example, a DSR codec may be switched to a codec that supports dual-tone multi-frequency (DTMF) digits (see RFC 2833), other line and trunk signals and multi-frequency tones (using the RTP payload format described in RFC 2833) for DTMF recognition on server; gateway to server. In addition, codec switches may occur for: (i) silence detection features to DSR features; (ii) Codec specific speaker recognition or other tasks to be applied sequentially or simultaneously; (iii) conventional codec to DSR (when speech is detected); (iv) a default DSR codec to another DSR codec; (v) reconstruction to non-reconstruction (and vice-versa); and (vi) utterance encryption.

In preferred embodiments, the encoded speech data is wrapped/transmitted in RTP streams along with its RTCP control layer. The data in the RTP stream (e.g., DSR stream) preferably comprises ECC (Error Correction Code) mechanisms to reduce the effect of packet losses (as described above). A compression scheme in the nomenclature may include particular ECC mechanisms.

The DSR session control layer 2005 initiates and controls DSR uplink and downlink sessions and further provides codec negotiation at the beginning of a session and dynamic codec switching during the session, preferably using SDP over SIP or SOAP over SIP. As explained below, in another embodiment, the DSR session control layer 2005 preferably supports the initiation of additional payload devoted to the exchange of speech meta-information (for example as XML, SOAP etc . . . ). Alternatively, the DSR session control layer 2005 preferably supports the transport of the speech meta-information (e.g., as SOAP messages on SIP). The DSR session control layer 2005 negotiates the appropriate codecs according to various parameters based on, e.g., requirements of various networks using different data bit rates, delays and/or quality options. For a client unable to perform XML parsing or to run a SOAP engine, it is possible to run a statically defined version of SOAP (denoted SOAP* 2005*b*). In other words, the SOAP* layer 2005*b* is optional and does not require a SOAP engine for providing basic SOAP functionalities (the SOAP* layer can be replaced by other extensible protocols). Additional speech meta-information is exchanged over SOAP or over RTP (interleaved with the RTP package).

It is to be understood that although SOAP (SOAP over SIP, RTP, HTTP, TCP, . . . ) is a preferred embodiment for implementing DSR session control 2005 in the DSR stack 2004*a*, it is not required. It is only preferred that the DSR session control 2005 support the exchange of: (i) capability/support description (ii) support codec (lists, 3-message or more when parameter settings must be exchanged); and (iii) speech meta-information exchanges, and that the DSR session control layer be extensible.

The DSR framework according to the present invention is preferably compatible with Voice over IP protocol or wireless infrastructure (e.g. 3GPP or 3GPP2) with minimum modifications/extensions or more preferably, and more preferably with no modifications. As such, in preferred embodiments, a DSR stack is based on the H.323 protocol standard and is compatible with H.323. The DSR framework of FIG. 13 is compatible with 3GPP, IETF, etc., and the SIP (session initiation protocol) standard, SIP gateways and terminals (which may require appropriate registration of the headers and payload with appropriate standard bodies (IETF; 3GPP)). The DSR session control layer 2005 is based, respectively, on the H.323, SIP, and/or SDP (session description protocol) standards (or extensions thereof). In the framework of FIG. 13, DSR session control is based on SIP and SDP.

As an alternative, H.323 is a standard approved by the ITU (international telecommunication union) to promote compatibility in multimedia communications over IP networks. An H.323 stack is an integrated set of software programs that perform the functions needed to establish and maintain real time multimedia sessions over IP data networks and provides a high level API for the data streams and client application 2001. An H.323 stack comprises a conference manager to manage all conference setup activity, an H.225 layer that handles packetization and synchronization of all media streams during a session and a H.245 layer to control communications between endpoints in the network. The H.245 enables codec selection and capability negotiation within H.323, wherein bit rate, frame rate, picture format, and algorithm choices are elements that are negotiated via H.245. This would be a H.323/profile of the framework described for SIP/SDP in FIG. 13. H.323 is a different case and there can be protocol conversions through gateways from SIP/SDP to a H.323 stack.

While H.323 is a recognized standard for VoIP terminals, the IETF (Internet Engineering Task Force) has also produced specifications for other types of multimedia applications. These other specifications include: (i) Session Description Protocol (SDP), RFC 2327; (ii) Session Announcement Protocol (SAP); (iii) Session Initiation Protocol (SIP); and (iv) Real Time Streaming Protocol (RTSP), RFC 2326. The latter three specifications are alternative signaling standards that allow for the transmission of a session description to an interested party (but others exist). SAP is used by multicast session managers to distribute a multicast session description to a large group of recipients, SIP is used to invite an individual user to take part in a point-to-point or unicast session, RTSP is used to interface a server that provides real time data. In all three cases, the session description is described according to SDP. When audio is transmitted, it is transmitted via RTP.

SIP is an IETF standard protocol for initiating an interactive multimedia user session. SIP is a request-response protocol, dealing with requests from clients and responses from servers. Participants are identified by SIP URIs (e. SIP invitations, which are used to create sessions, carry session descriptions which allow participants to agree on a set of compatible media types. SIP supports user mobility by proxying and redirecting requests to the user's current location. Users can register their current location. SIP is not tied to any particular conference control protocol. SIP is designed to be independent of the lower-layer transport protocol and can be extended with additional capabilities. SIP can also be used in conjunction with other call setup and signaling protocols. In that mode, an end system uses SIP exchanges to determine the appropriate end system address and protocol from a given address that is protocol-independent. For example, SIP could be used to determine that the party can be reached via H.323, obtain the H.245 gateway and user address and then use H.225.0 to establish the call. The Session Initiation Protocol is specified in IETF Request for Comments [RFC] 2543, which is incorporated herein by reference.

The Session Description Protocol (SDP) is an ASCII text based protocol for describing multimedia sessions and their related scheduling information. The purpose of SDP is to convey information about media streams in multimedia sessions to allow the recipients of a session description to participate in the session. SDP can be used in conjunction with a connection handling/device control protocol such as SIP to communicate the information needed to set up network connections, including for example, voice connections, voiceband data connections, video connections and baseband data connections (such as fax relay, modem relay, etc.). Standard SDP syntax such as defined in RFC 2327, which is incorporated herein by reference, can be used to describe the network connections, addresses and other parameters.

The DSR transport protocol layer 2006 preferably implements RTP and RTCP to packet the encoded speech data and control data for transmission and control of the encoded speech data over the network. In other embodiments as described below, SIP with SDP and possibly SOAP, WSDL or RTSP can be used to perform the session control and exchange speech meta-information and SERCP (speech engine remote control protocol) instructions as well as multi-modal synchronization (e.g., the synchronization protocols as described, for example, in the above-incorporated U.S. patent application Ser. No. 10/007,092). As further explained below, speech meta-information can be exchanged as RTP payload possibly dynamically switched when interleaved with DSR/speech payload.

As is known, the H.225 protocol of H.323 uses the packet format specified by RTP and RTCP for packaging audio (and video) data for transport, sequence numbering of the data packets and error detection. After a call is initiated, one or more RTP or RTCP connections are established to synchronize the received packets in proper order. Furthermore, SIP supports RTP and RTCP for transporting real-time data and providing QoS feedback.

When a DSR framework is implemented on wireless networks where packet losses can be a significant problem, it is preferable that the DSR framework be based on SIP over UDP rather than H.323 or SIP over TCP. Indeed, VoIP over TCP is more affected by packet losses than with RTP over UDP. However, in other preferred embodiments, the DSR framework can be designed to be as compatible as possible with the H.323 protocol, wherein various key principles of H.323 (especially H.245) (and extensions thereof) are used to implement specific behaviors of DSR.

Referring again to FIG. 13, the speech meta-information 2020 and 2021 represents meta-information that can be exchanged between client 2001 and server 2002. The speech meta-information comprises speech detection (speech, no speech) and barge-in detection/attention meta-information. The speech meta-information for detecting speech/no speech, comprises various markers for specifying: (i) beginning of speech notification; (ii) end of speech notification; (iii) silence detection; and (iv) end-point estimate (Speech reco definition). The speech/no speech meta-information comprising "beginning of speech notification" is transmitted from the client to the server. The "end of speech notification" information is transmitted from client to server and from server to client. The "silence detection" information is transmitted from client to server. The "end-point estimate" information is transmitted from client to server and from server to client (based on completion of utterance).

The speech meta-information 2020, 2021 further comprises "barge-in detection/attention" information. The speech meta-information that provides "barge-in" functionality comprises various markers for specifying: (i) end of played prompt; and (ii) barge-in events. The "end of played prompt" marker is transmitted from the client to server to enable the server to prepare to detect speech. The "barge-in events" meta-information comprises markers of Barge-in events: (i) from client to server: detected input stop playing; (ii) from server to client: detected input stop playing whatever comes from server; and (iii) from client to server: prompt that was played (e. g. URI of prompt or annotated text, with volume settings).

In other embodiments, the meta-information 2020, 2021 further comprises display/GUI information (e.g., logo display on a screen after a request is made to the server) providing multi-modal capability (speech or GUI). The meta-information sent from the server to client comprises presentation and update information. The meta-information sent from client to server comprises (i) client settings/delivery context; (ii) client events; and (iii) other application specific messages.

In other embodiments, the meta-information 2020, 2021 further comprises meta-information for DTMF (dual tone multi-frequency) and keypad exchanges. The DTMF and keypad exchanges are to provide for IVR/Voice portal capabilities. The meta-information comprises: (i) decoded DTMF(digits, strings, durations); and (ii) DTMF detection events. To provide DTMF support, the client and server exchange information such as decoded DTMF strings, duration or time-stamp of edges, and DTMF detection events (even if not decoded). The meta-information for Tones (audio) is transmitted (in band) from server to client. The DTMF/keypad strings are exchanges as speech meta-information between the client and speech server and between a MSC (mobile switching center) the speech server and client. Dynamic codec switching is supported by DSR Session Control 2005 to switch between different codecs when switching from speech to DTMF, for example.

In other embodiments, the meta-information comprises "front-end and noise compensation" parameters. These parameters comprise, for example "tuning" parameters for silence detection and speech detection via settings to control (which are exchanged between server and client), "front-end" parameters that are sent from client to server (e.g., current settings: e. g. transformation parameters) and from server to client (setting changes), and "background noise level" parameters.

The meta-information further comprises client messages that comprise "client settings" parameters such as volume control, client type, user preferences and echo spoken text, echo recognized text, and don't echo recognized text parameters. The client messages also include client events (e.g., settings changes (new volume), plugged in new microphone (hands-free microphone), push to talk information, client event barge-in (e.g., client to server: stop playing)) and dictation mode vs. command and control parameters. The client messages further comprise externally acquired parameters (e.g., speed of a car, local noise level, noise level changes), ID of selected input microphone (in microphone array/multiple microphone systems) and speaker identity (local recognition) parameters.

In other embodiments, the meta-information 2020, 2021 comprises encryption notice/exchanges. In addition, the meta-information comprises annotations including: (i) local recognition estimates (Nbest lists, partial decoded scripts, context, hot words), (ii) data files updates (e.g., expected grammar file (e. g. C& C), URI of data files)); (iii) application specific parameters (e.g., reference to last prompt played); and (iv) speech frame markers (e.g., exact frame position of a codec switch). The meta-information further comprises "Echo" parameters including: (i) echo spoken text; (ii) echo recognized text; and (iii) don't echo recognized text.

In still further embodiments, the meta-information 2020, 2021 comprises: (i) "degree of interactivity" parameters (sent from client to server) that specify, e.g., maximum latency for recognition or response (dialog application versus query or dictation); (ii) guaranteed transmission exchanges (e.g., packet confirmation request, re-transmission requests, confirmation exchanges); (iii) application specific exchanges (e.g., engine asynchronous commands, data file pointers, result exchanges); (iv) other call control instructions (e.g., where to forward results, where to forward DSR stream, where to forward annotated DSR stream, call control instructions); (v) information on data interleaved with audio in RTP stream (e.g., noise samples, prompt samples); and (vi) information on other audio streams (e.g., audio stream for speaker recognition). It is to be appreciated that any form of meta-information can be exchanged depending on the application and that that present invention is not limited in any manner in that regard. The system 2000 comprises multi-modal synchronization modules 2022 (client) and 2023 (server) for managing the meta-information that enables synchronization of different views (speech, GUI) of a multi-modal browser application 2001 (e.g., multi-modal DOM-based browser as described in the above-incorporated U.S. patent application Ser. No. 10/007,092). The system further comprises speech engine remote control modules 2024 (client) and 2025 (server) for managing meta-information that enables remote control of speech engines 2016. Multi-modal synchronization can be implemented via SOAP 2027 or remote DOM and engine remote control can be implemented via WSDL 2026 over SOAP or SOAP*.

As noted above, the MM synchronization managers 2022, 2023 and associated synchronization protocols provide mechanisms for synchronizing the channel-specific (views) browsers of a DOM-based multi-modal browser (as described in the above-incorporated U.S. patent application Ser. No. 10/007,092). The synchronization protocols comprise mechanisms for exchanging synchronization information between a multi-modal shell and channel-specific browsers. In one embodiment, synchronization information that is exchanged comprises (1) DOM filtered events such as DOM Level 2 UI events (and higher), XHTML generalized UI events, VoiceXML events, etc. (2) HTTP (or other protocols) requests, such as URI requests; (3) DOM commands such as page push, output events, set events, get/set variables, DOM tree manipulation, etc. (4) blocking messages and (5) confirmation messages. To enable synchronization, events are systematically time stamped. This allows the different events to be ordered and enables disambiguation of ambiguous or contradictory events coming from different views. Preferably, clock synchronization protocol/exchange mechanisms are provided, such as the Network Time Protocol (NTP) adapted to the network capabilities (e.g. WAP), to provide time synchronization. In a preferred embodiment, the synchronization protocols are implemented using SOAP. As is known in the art, SOAP provides a mechanism for information exchange using HTTP and XML to provide communication between systems in a network. In other embodiments, synchronization may be implemented using, for example, socket connections (event communication) and HTTP update messages.

As noted above, the speech engine remote control managers 2024, 2025, and associated control protocols provide mechanisms for remotely controlling the speech engines 2016. In one embodiment (as described above) the engine control meta-information is transmitted via one of the proposed mechanism as discussed above. In another preferred embodiment, SERCP is implemented via SOAP over RTSP SIP, HTTP, TCP, RTP, etc., or via WSDL (on top of SOAP) 2026 to describe the commands/interfaces supported by the engines 2016. In particular, WSDL allows the speech and audio subsystems to be implemented as web services or described as a syntax and semantics derived from RTSP on top of RTSPs, SIP, HTTP or TCP. When using WSDL, this framework is compatible with the web service evolution. WSDL is standard-based and is robust, modular, scalable and distributable. WSDL provides ease of integration: WDSL is independent of connectivity and gateway vendor, it provides integration of different engines, it is independent of the application platform (e., can be implemented with IVR scripts (State tables, Scripts), imperative (C/C++ or java), with VoiceXML Browsers, free flow applications, and multi-modal applications). WSDL removes complexities: engine step by step hand holding, racing conditions and is extensible (no limitations as previous APIs approaches).

Transport of Meta-information

In accordance with the present invention, various embodiments transmitting the speech meta-information may be implemented (e.g., in band, out of band). More specifically, the speech meta-information can be exchanged "in band", such as RTP packets interleaved with the DSR RTP payload. This process may be used for particular specific speech meta-information by allowing the meta-information to be part of the codec format (e.g. speech, no speech etc.). Further, transmission of the speech meta-information may be achieved through a process called dynamic payload switches that does require initiation of the payloads at the session initiation (SIP/SDP) to assign a dynamic payload identifier that can then be used to switch dynamically by changing the payload identifier (without establishing a new session through SIP/SDP). In other embodiments, it is possible that RTP is used to exchange the information in another RTP stream dedicated to exchanging speech meta-information (e.g. as payload application/XML in SOAP), instead of interleaving with DSR RTP payload.

The speech meta-information may be transmitted "out-of-band, such as extensions to the RTCP layer, as part of the DSR session control layer already used for SIP/SDP session initiation and control, and as part of any other suitable extensible mechanism (e.g., SOAP (or XML or pre-established messages) over SIP or HTTP (as discussed below), HTTP, as a separate point-to-point connection (sockets), or as meta-information media over a separate RTP stream as noted above. It is to be understood that speech meta-information typically requires the highest possible quality of service (e.g., Conversational QoS in 3GPP). Whatever infrastructure or mechanism is employed to assign this QoS (by default based on registered payload type, based on RSVP, etc.), a DSR framework preferably includes such mechanism for the speech met-information. Of course, when engaged in dialogs, the DSR RTP stream is preferably provided the conversational QoS.

The factors that should be considered in selecting appropriated transmission protocols is based on the application or the network/infrastructure where the DSR framework profile is expected to be deployed (e.g., a 3GPP framework is different from a wired LAN VoIP framework). The RTCP layer is known to be unpredictable with its exchanges and there are risks in perturbing the RTCP mechanism by adding or overloading the RTCP headers. Additional sockets/TCP are not preferred because additional sockets and point-to-point connections are expensive for large scale deployment (which is especially true for IVR and VoIP gateways) and because tunneling through firewalls and wireless gateways may not always be guaranteed (while it would be for SIP/HTTP and SOAP).

In any event, a given transport protocol for the meta-information is preferably functional in that it provides an extensible mechanism to send speech meta-information between client/server (both directions), follows a challenge/response model, be able to tunnel through firewalls and pass through gateways, and that such protocol provide optional support (e.g., capability description). Other factors that are considered in selecting an appropriate transport protocol is implementation (e.g., CPU/memory impact on terminal, acceptable bandwidth traffic, alternatives when not available) and that it be interoperable with IVR and other VoIP networks.

In one preferred embodiment, a mechanism for exchanging meta-information is based on the following framework: (1) An in-band option (with RTP Payload) for speech/no-speech markers (speech/no speech markers are well suited for in-band transmission); (2) DSR control channel (out-of-band—unless if this is transported also in-band) for all other speech meta-information (and optionally speech/no-speech marker—possibly for redundancy); (3) an extensible mechanism for optional support; and (4) a mechanism for supporting minimum speech syntax for alternative/non-extensible systems and for providing capability description.

In one embodiment, meta-information can be transmitted by piggyback on the SIP session management layer, which affords the advantages of (i) using the same ports and piggy back on a supported protocol that will be able to pass end-to-end across the infrastructure (gateways and firewalls), (ii) providing guarantee of delivery, and (iii) no reliance on mixing payload and control parameters. The RTP layer is also guaranteed to pass end-to-end across the infrastructure, but RTP is not necessarily guaranteed delivery. Further, it can be problematic to introduce too much data in the RTP channel. In general, it is not preferably to mix payload and control information.

Other transmission solutions include HTTP, which is becoming increasingly supported by WAP (wireless application protocol) (application layer) and by MExE (mobile execution environment), and which will tunnel through firewalls and gateways.

Meta-information is preferably transmitted out of band (e.g., not as part of an RTP DSR payload, format) to provide robust data exchanges. However, as discussed above, the meta-information can be interleaved via dynamic payload switches or in a separate RTP stream, especially if such RTP stream can be rendered reliable by the underlying protocols, acknowledgments or errors correction codes. For example, data exchange of front-end and noise compensation parameters, client messages (e.g., engine data exchange, setting and engine inputs), security, annotations, echo (e.g., engine settings), application specific exchanges, and degree of interactivity (e.g., engine settings) are preferably robust exchanges because of the critically of the data exchanged. Further transport control should be provided for guaranteed transmission exchanges, other call control exchanges, information on data interleaved with audio in RTP stream, and information on other audio streams.

Moreover, with respect to barge-in detection/attention, out-of-band is preferred for the barge-in events associated with engine control (e.g., client to server: detected input stop playing, server to client: detected input stop playing whatever comes from server, and client to server: prompt that was played (e.g., URI of prompt or annotated text, with volume settings—XML/Text info exchange.

Furthermore, DTMF speech meta-information could be exchanged with the following mechanisms: (1) in band as RTP packets interleaved with the DSR RTP payload (as a RFC 2833 format); (2) out-of-band as extensions to the RTCP layer, as part of the DSR session control layer already used for SIP/SDP session initiation and control; or (3) with an extensible mechanism (e.g., SOAP over SIP, or over in-Band RTP), sockets). Preferably, a DTMF data exchange is performed via Session Control/Extensible to exchange decoded strings and durations and events. Examples of format for such telephony events are provided by RFC 2833.

It is to be appreciated that the system 2000 in FIG. 13 can be implemented in server-side applications, wherein the audio I/O is captured via the client and the server comprises a server application and speech engines for processing the captured speech. The server-side (voice recognition) applications include, for example, voice services (e.g., name dialing, directory assistance), information applications (e.g., voice portals (flight, weather, news, movies), location-specific information, voice navigation of maps), transaction-based applications (e.g., banking, m-commerce, form filling), information capture (e.g., dictation) and messaging. In addition the server-side applications include thin client multi-modal applications (such as a DOM-based Multi-modal browser as described below and described in detail in U.S. patent application Ser. No. 10/007,092, filed on Dec. 4, 2001, entitled "Systems and Methods for Implementing Modular DOM (document object model)-Based Multi-Modal Browsers", which is commonly assigned and incorporated herein by reference.)

Further, the system 2000 may be implemented for client-side applications wherein the client executes a client application which ships audio I/O to the server for processing via remote engines. In other words, in this embodiment, server-side speech engines provide web services such as remote dictation with the client application. Another example of client-side applications include fat client configurations of multi-modal applications (DOM-based Multi-Modal browsers) with remote speech engines. It is to be further appreciated that the system 2000 can be implemented in a hybrid embodiment, wherein the applications are executed on both the client and server.

Figure 15:
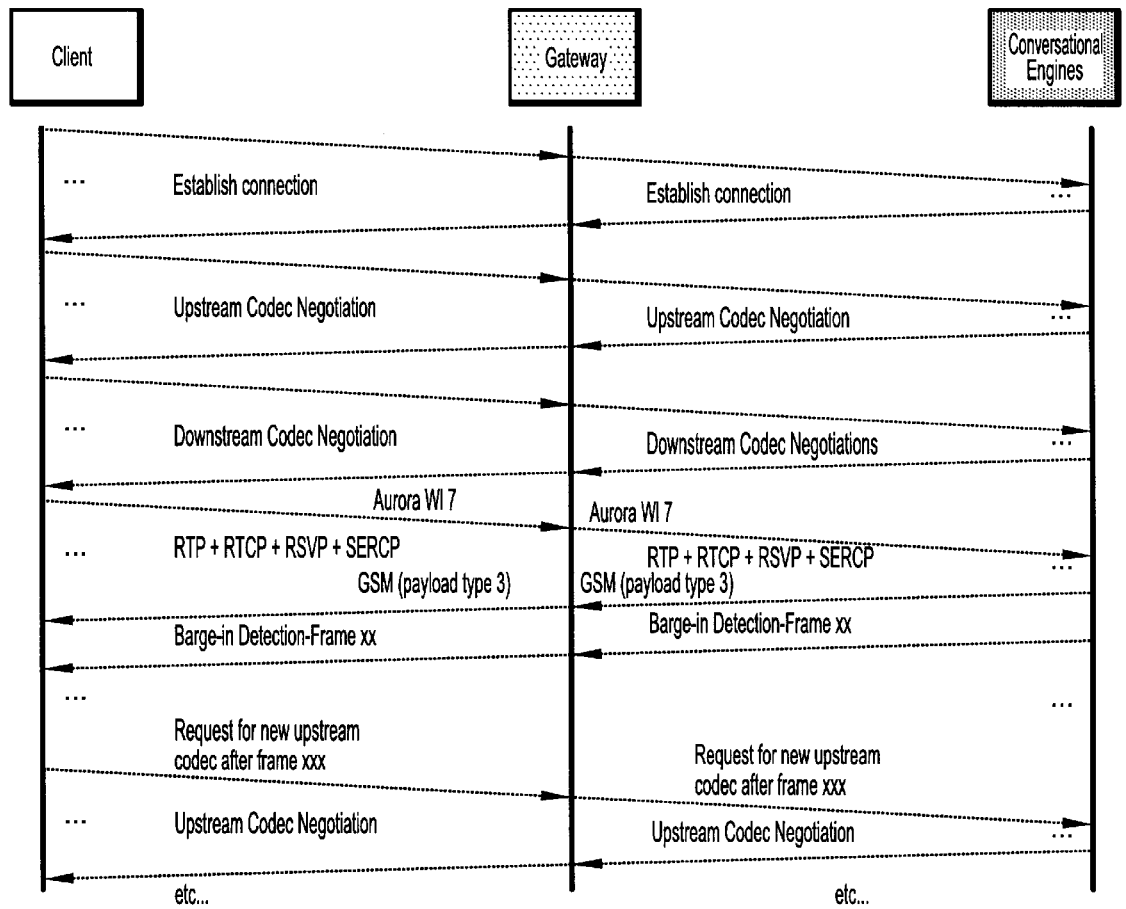
FIG. 15 is a diagram illustrating client/server communication using a DSR protocol stack according to an embodiment of the present invention.

FIG. 15 is a diagram illustrating client/server communication using a DSR framework protocol stack according to an embodiment of the present invention. A client application requesting server-side processing of speech data (via conversational engines on a remote server) communicates with the server by initially establishing a connection. As noted above, call settings and control messaging is preferably implemented using a DSR session control protocol based on the H.323 stack (on VOIP infrastructures) or SIP messages (which is a preferred approach, in particular, for IETF and 3G (3GPP) infrastructures). SIP or H.323 could be arbitrarily selected depending on a particular design, or preferably with the option of being able to convert (gateway) between SIP and H.323. In a preferred embodiment, SIP/SDP is employed to capture the evolution of IMS standards. This is the leading edge approach. Preferably, session control is implemented based on SIP (for SDR session control) and SDP (for DSR session description) over UDP to provide maximum robustness to packet losses. Other protocols may be implemented (e.g., SOAP) as discussed herein.

Once the connection is established between client and server, codec negotiation is performed. Preferably, codec negotiation is supported by a socket connection active throughout the communication (TCP or UDP with a confirmation mechanism). The H.245 protocol exchanges tables of supported codecs and DSR schemes and is a possible mechanism for codec negotiation. SIP initiation with SDP proposing the preferred codecs is a preferred approach. As discussed herein, speech meta-information exchanges can be used to reduce the amount of codecs to propose by pre-negotiating through SOAP exchanges, for example. This enables a terminal to select codecs on the basis of the terminal capabilities. Further, a corresponding SIP codec negotiation can be specified and implemented. Preferably, the upstream and downstream coders are separately negotiated.

The codec tables (or SIP negotiation) should enable pointing to an object code (e.g. applet to download to implement a particular DSR scheme, etc . . . ). A mechanism is further included to negotiate the type of object code (i.e. applet, vs. OS specific binaries etc . . . ). In addition, security issues associated with codec negotiation are considered. Preferably, the protocol supports the capability to specific codec object code. At the same time, a terminal or server may decide not to support this capability and not accept it during codec negotiation or to accept it only after appropriate authentication of the provider of the object. As shown by way of example in FIG. 21, an Aurora WI 7 protocol is used for the upstream codec and a GSM (Global System for Mobile communication) protocol is used for the downstream codec.

Preferably, the H.245 connection (H.323) or SIP with SDP (and possible speech meta-information pre-negotiation) connection provides a mechanism for dynamically changing the codec/DSR schemes as needed throughout the evolution of the application. Indeed, as shown by way of example in FIG. 15, a barge-in detection in frame XX can require a change in, e.g., the upstream codec (e.g., to ship different acoustic features for a particular utterance). The DSR framework stack preferably permits acoustic front-end parameters to change during a session via a different RTP stream (different ports), by switching the codec starting after a given packet number or by dynamic payload switch if the different codec were pre-negotiated through SDP at the SIP initiation of the session. Similarly, new RTP connections can be opened when extra DSR streams must be provided (e.g. to provide simultaneous speech and speaker recognition (using different acoustic features), which would require establishing another SIP session when using SIP/SDP.

In other embodiments of the present invention, additional mechanisms (not currently provided by conventional Voice over IP stacks (but not necessarily incompatible)) provide the capability for the source to specify that an utterance should be transmitted with guaranteed delivery (e.g. TCP or UDP+ confirmation instead of RTP), the capability for the recipient to request repetition of a particular utterance segment specified by its end points (within a given time frame after initial transmission), the capability for the sender to request confirmation that the recipient has received a particular utterance segment, and provide guaranteed delivery (utterance segments and other protocols). This can be done with a simple acknowledgment mechanism. The protocols for providing guaranteed delivery should account for possible losses of connections. For example, threads that wait for confirmations that will never arrive because of a loss of connection should appropriate unblock or terminate with events that the client application (or server application) can handle. Guaranteed delivery mechanisms should fail and return an error after a parameterized time (or amount of re-transmission).

Further, QoS messages and criteria should be implemented for DSR. Preferably, a mechanism provides the capability to dynamically change the required QoS during a session. The mechanism should have minimum impact on existing QoS protocols such as RSVP. This can also be done by assigning given QoS to particular registered payload (e.g., this is the 3GPP approach). Mechanisms depend on infrastructure, but such mechanisms are preferably available and provided by the profile of the framework under consideration. As explained above, speech meta-information as well as multi-modal synchronization and SERCP exchanges are preferably performed with the highest available QoS or at least a "conversational quality". DSR RTP is preferably accorded a quality equivalent to voice communications.

Further, as noted above, a DSR system according to the present invention preferably supports barge-in. For example, when barge-in can be detected by the local DSR encoder or via Voice Activity Detection, it could block the downstream audio play. The remote engines are notified that the output play has been interrupted and indicate at what packet number. When barge-in is not detected by the local DSR encoder or when it is better processed on a remote engine, a control signal could be sent that will interrupt output playback on the client. Clearly network latencies make this approach challenging (hence the need for high QoS).

There are various mechanisms for implementing barge-in. For instance, an existing available connection can be reused, e.g., a RTCP layer with extension to send elementary control messages, or H.245 or codec SIP/SDP negotiation connection to send elementary control messages. Alternatively, an additional dedicated connection can be opened for these kind of control messages. Preferably, such alternatives should be compatible with Voice over IP and wireless gateways.

A DSR framework according to the present invention can be implemented via compiling a list of classes for DSR framework connections. Such classes are preferably developed based on function of the client capabilities and based on a function of the network characteristics and available bandwidth. In term of default codecs, a preferred scheme can be based per classes of DSR connections. In particular, clients would be expected to support at least one DSR default encoding scheme and the server may have to support several possible default encoding schemes.

Figure 16:
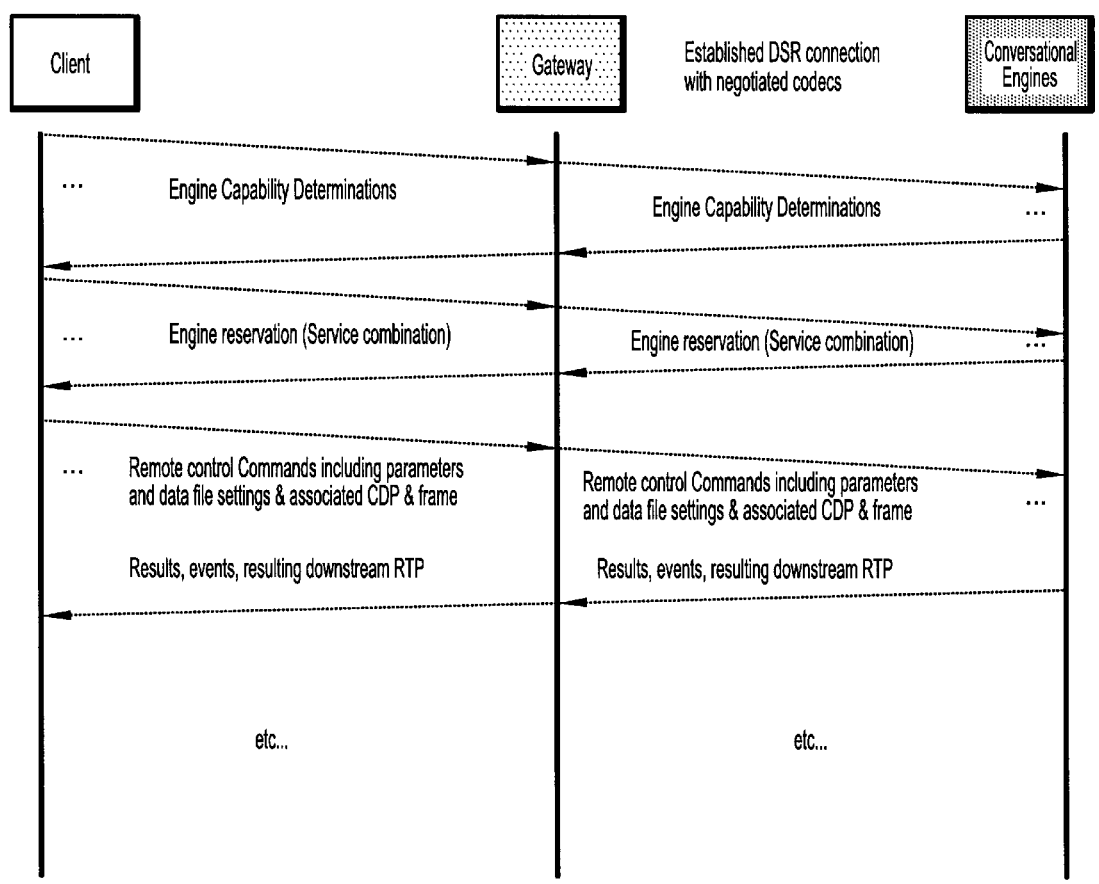
FIG. 16 is a diagram illustrating client/server communication of SERCP (speech engine remote control protocol) data exchanges according to an embodiment of the present invention.

FIG. 16 is a diagram illustrating client/server communication of SERCP data exchanges according to an embodiment of the present invention. In FIG. 16, a DSR connection with negotiated codecs is assumed. Initially, the client and server exchange data to determine engine capabilities. Then, data is exchanged for engine reservation. The client will then send remote control commands (SERCP) comprising parameters and data file settings and associated DSR streams. The server returns results and event downstream using, e.g., RTP.

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims

What is claimed is:

1. A distributed speech processing system, comprising:
   a conversational application and a task manager that abstracts from the conversational application, the discovery and remote control of audio I/O and speech engine services;
   an audio I/O processing service, which is programmable by control messages generated by the task manager on behalf of the conversational application to provide audio I/O services for the conversational application; and
   a speech engine service, which is programmable by control messages generated by the task manager on behalf of the conversational application to provide speech processing services for the conversational application.

2. The system of claim 1, wherein the audio I/O processing service and speech engine service comprise Web services.

3. The system of claim 1, wherein the control messages are encoded using XML (eXtensible Markup Language) and wherein the control messages are exchanged using SOAP (Simple Object Access Protocol).

4. The system of claim 1, wherein each service comprises interfaces that are described using WSDL (Web Services Description Language).

5. The system of claim 4, wherein WSFL (web services flow language) or an extension thereof is used to dynamically configure the processing flow of the system.

6. The system of claim 1, wherein the speech engine service provides one of automatic speech processing (ASR) services, text-to-speech (TTS) synthesis services, natural language understanding (NLU) services, and a combination thereof.

7. The system of claim 1, wherein the audio I/O processing service provides speech encoding/decoding services, audio recording services, audio playback services, and a combination thereof.

8. The system of claim 1, further comprising a load manager that dynamically allocates and assigns the services for the conversational application, based on control messages generated by the task manager on behalf of the conversational application.

9. The system of claim 1, wherein the services are programmed to negotiate uplink and downlink audio codecs for generating RTP-based audio streams.

10. The system of claim 1, wherein the speech engine services are dynamically allocated to the conversational application on one of a call, session, utterance and persistent basis.

11. The system of claim 1, wherein the services are discoverable using UDDI (Universal Description, Discovery and Integration) or an extension thereof.

12. The system of claim 1, wherein services provided by the speech engine service and audio I/O processing service are defined as a collection of ports.

13. The system of claim 12, wherein types of ports comprise audio in, audio out, control in, and control out.

14. The system of claim 1, wherein the audio I/O service comprises a gateway that connects audio streams from a network to the speech processing services.

15. The system of claim 14, wherein the network comprises a PSTN (public switched telephone network).

16. The system of claim 14, wherein the network comprises a VoIP (voice over IP) network.

17. The system of claim 14, wherein the network comprises a wireless network.

18. The system of claim 1, wherein the distributed speech processing system comprises an interactive voice response (IVR) system, and wherein the system further comprises a telephony gateway, wherein the telephony gateway is abstracted from the conversational application and wherein the telephony gateway receives and processes an incoming call to assign the call to a conversational application.

19. A speech processing web service, comprising:
   a listener for receiving and parsing control messages that are used for programming the speech processing web service, wherein the control message are encoded using XML (eXtensible Markup Language) and exchanged using SOAP (Simple Object Access Protocol);
   a business interface layer for exposing speech processing services offered by the web service, wherein the services are described and accessed using WSDL (web services description language); and
   a business logic layer for providing speech processing services, the speech processing services comprising one of automatic speech recognition, speech synthesis, natural language understanding, acoustic feature extraction, audio encoding/decoding, audio recording, audio playback, and any combination thereof.

20. The speech processing web service of claim 19, wherein a service of the speech processing web service is dynamically allocated and assigned to a conversational application and programmed by the conversational application.

21. The speech processing web service of claim 19, wherein the web service is advertised via UDDI.

22. A method for providing distributed speech processing, comprising the steps of:
   receiving an incoming call by a client application;
   assigning the call to an application having a task manager that is abstracted from the application for discovering and controlling speech processing services including audio I/O and speech engine services;
   the task manager generating a control message to a router/load manager for requesting a speech processing service on behalf of the application to service the incoming call;
   the router/load manager dynamically allocating a speech processing service to the application and providing an address of the allocated speech processing service to the task manager;
   the task manager generating a control message for dynamically programming the allocated speech service based on requirements of the application; and
   the application processing the incoming call using the programmed speech service.

* * * * *